United States Patent
Matsunami et al.

(10) Patent No.: US 7,206,832 B2
(45) Date of Patent: Apr. 17, 2007

(54) METHOD AND SYSTEM OF MANAGING AN ACCESS TO A STORAGE SYSTEM IN A COMPUTER SYSTEM

(75) Inventors: Naoto Matsunami, Hayama (JP); Akira Yamamoto, Sagamihara (JP); Hideki Kamimaki, Fujisawa (JP); Masatoshi Ichikawa, Yokohama (JP); Jun Matsumoto, Tokyo (JP); Yasuyuki Mimatsu, Fujisawa (JP); Ikuya Yagisawa, Yokohama (JP); Masayuki Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 228 days.

(21) Appl. No.: 10/893,095

(22) Filed: Jul. 14, 2004

(65) Prior Publication Data

US 2005/0021727 A1    Jan. 27, 2005

Related U.S. Application Data

(63) Continuation of application No. 09/523,379, filed on Mar. 10, 2000, now Pat. No. 7,082,462.

(30) Foreign Application Priority Data

Mar. 12, 1999    (JP)    ............................. 11-066019

(51) Int. Cl.
    *G06F 15/173*    (2006.01)
(52) U.S. Cl. .................... 709/223; 709/213; 709/217; 711/100
(58) Field of Classification Search ............... 709/223, 709/224, 217, 213–216; 711/100
    See application file for complete search history.

(56) References Cited

U.S. PATENT DOCUMENTS

| 5,754,756 | A | * | 5/1998 | Watanabe et al. ............ 711/114 |
| 5,809,516 | A | * | 9/1998 | Ukai et al. ................... 711/114 |
| 5,905,847 | A | | 5/1999 | Kobayashi et al. |
| 5,941,972 | A | | 8/1999 | Hoese et al. |
| 5,975,738 | A | * | 11/1999 | DeKoning et al. ............ 700/79 |
| 6,073,218 | A | | 6/2000 | DeKoning et al. |

(Continued)

FOREIGN PATENT DOCUMENTS

| JP | 06-168198 | 6/1994 |
| JP | 07-152491 | 6/1995 |
| JP | 10-021159 | 1/1998 |
| JP | 10-228352 | 8/1998 |
| JP | 10-333839 | 12/1998 |
| WO | WO98/14871 | 4/1998 |

*Primary Examiner*—Philip B. Tran
(74) *Attorney, Agent, or Firm*—Mattingly, Stanger, Malur & Brundidge, P.C.

(57) ABSTRACT

The Computer System consists of components including more than one Computer and Storage Subsystem to which more than one Computer are connected. The Storage Subsystem is equipped with more than one Storage Unit, Management Table registering information to manage Storage Units accessible by each of the Computers and Controller to control accesses by more than one Computer to more than one Storage Unit. The controller controls the accesses according to the information set in the Management Table when the Storage Unit is accessed by the Computer.

18 Claims, 22 Drawing Sheets

| Owner Upper Level Computer Identifier | Port Number | Target ID | Virtual LUN | Internal LUN | Attribute | Cache Attribute |
|---|---|---|---|---|---|---|
| PC0 | 0 | 0 | 0 | 1 | Private | Usual |
| PC0 | 0 | 0 | 1 | 0 | Shared | Residence |
| PC1 | 0 | 0 | 0 | 2 | Private | Usual |
| PC1 | 0 | 0 | 1 | 0 | Shared | Residence |
| PC2 | 0 | 0 | 0 | 3 | Private | Usual |
| PC2 | 0 | 0 | 1 | 4 | Private | Usual |
| PC2 | 0 | 0 | 2 | 0 | Shared | Residence |
| PC3 | 1 | 0 | 0 | 5 | Private | Usual |
| PC3 | 1 | 0 | 1 | 0 | Shared | Residence |
| PC4 | 1 | 0 | 0 | 6 | Private | Usual |
| PC4 | 1 | 0 | 1 | 0 | Shared | Residence |
| PC5 | 1 | 0 | 0 | 7 | Private | Usual |
| PC5 | 1 | 0 | 1 | 0 | Shared | Residence |
| Management Console | 0 | 0 | 0 | 8 | Privileged | Usual |
| Management Console | 0 | 0 | 1 | 9 | Privileged | Usual |

Columns: 1321, 1322, 1323, 1324, 1325, 1326, 1327; Table 132a

U.S. PATENT DOCUMENTS

| | | |
|---|---|---|
| 6,115,772 A * | 9/2000 | Crater .................. 710/306 |
| 6,148,377 A | 11/2000 | Carter et al. |
| 6,185,601 B1 | 2/2001 | Wolff |
| 6,209,023 B1 | 3/2001 | Dimitroff et al. |
| 6,260,120 B1 * | 7/2001 | Blumenau et al. .......... 711/152 |
| 6,295,575 B1 | 9/2001 | Blumenau et al. |
| 6,343,324 B1 | 1/2002 | Hubis et al. |
| 6,421,711 B1 | 7/2002 | Blumenau et al. |
| 6,484,229 B1 | 11/2002 | Ichikawa et al. |
| 6,484,245 B1 * | 11/2002 | Sanada et al. ............. 711/164 |
| 6,493,825 B1 * | 12/2002 | Blumenau et al. .......... 713/168 |
| 6,499,075 B2 | 12/2002 | Oeda et al. |
| 6,567,889 B1 | 5/2003 | DeKoning et al. |

\* cited by examiner

FIG.4

| Owner Upper Level Computer Identifier | Port Number | Target ID | Virtual LUN | Internal LUN | Attribute |
|---|---|---|---|---|---|
| PC0 | 0 | 0 | 0 | 0 | Shared |
| PC0 | 0 | 0 | 1 | 1 | Private |
| PC1 | 0 | 0 | 0 | 0 | Shared |
| PC1 | 0 | 0 | 1 | 2 | Private |
| PC1 | 0 | 0 | 2 | 3 | Shared |
| PC2 | 0 | 0 | 0 | 4 | Private |
| PC2 | 0 | 0 | 1 | 3 | Shared |
| PC3 | 1 | 0 | 0 | 5 | Private |
| PC3 | 1 | 0 | 1 | 0 | Shared |
| PC4 | 1 | 0 | 0 | 6 | Private |
| PC4 | 1 | 0 | 1 | 0 | Shared |
| PC5 | 1 | 0 | 0 | 7 | Private |
| PC5 | 1 | 0 | 1 | 0 | Shared |
| Management Console | 0 | 0 | 0 | 8 | Privileged |
| Management Console | 0 | 0 | 1 | 9 | Privileged |

FIG.8

| Owner Upper Level Computer Identifier | Port Number | Target ID | Virtual LUN | Internal LUN | Attribute | Cache Attribute |
|---|---|---|---|---|---|---|
| PC0 | 0 | 0 | 0 | 1 | Private | Usual |
| PC0 | 0 | 0 | 1 | 0 | Shared | Residence |
| PC1 | 0 | 0 | 0 | 2 | Private | Usual |
| PC1 | 0 | 0 | 1 | 0 | Shared | Residence |
| PC2 | 0 | 0 | 0 | 3 | Private | Usual |
| PC2 | 0 | 0 | 1 | 4 | Private | Usual |
| PC2 | 0 | 0 | 2 | 0 | Shared | Residence |
| PC3 | 1 | 0 | 0 | 5 | Private | Usual |
| PC3 | 1 | 0 | 1 | 0 | Shared | Residence |
| PC4 | 1 | 0 | 0 | 6 | Private | Usual |
| PC4 | 1 | 0 | 1 | 0 | Shared | Residence |
| PC5 | 1 | 0 | 0 | 7 | Private | Usual |
| PC5 | 1 | 0 | 1 | 0 | Shared | Residence |
| Management Console | 0 | 0 | 0 | 8 | Privileged | Usual |
| Management Console | 0 | 0 | 1 | 9 | Privileged | Usual |

FIG.12

| Port Number | Target ID | Virtual LUN | Internal LUN | WWN | S_ID | Attribute |
|---|---|---|---|---|---|---|
| 0 | 0 | 0 | 0 | WWNa | S_IDa | Private |
| 0 | 0 | 0 | 1 | WWNb | S_IDb | Private |
| 0 | 0 | 0 | 2 | WWNf | S_IDf | Private |
| 0 | 0 | 0 | 3 | WWNe | S_IDe | Private |
| 0 | 0 | 0 | 4 | WWNc | S_IDc | Private |
| 0 | 0 | 0 | 5 | WWNd | S_IDd | Private |
| 0 | 0 | 0 | 6 | - | - | Private |
| 0 | 0 | 0 | 7 | - | - | Private |
| 0 | 0 | 0 | 8 | WWNg | S_IDg | Private |
| ⋮ | ⋮ | ⋮ | ⋮ | ⋮ | ⋮ | ⋮ |

FIG.13

| User Name | Password | Virtual LUN | Internal LUN | Registration Status | Port Number | Target ID | Attribute | Computer Name |
|---|---|---|---|---|---|---|---|---|
| User A | PasswordA | 0 | 0 | Registered | 0 | 0 | Private | Computer a |
| User B | PasswordB | 0 | 1 | Registered | 0 | 0 | Private | Computer b |
| User C | PasswordC | 0 | 2 | Registered | 0 | 0 | Private | Computer f |
| User D | PasswordD | 0 | 3 | Registered | 0 | 0 | Private | Computer e |
| User E | PasswordE | 0 | 4 | Registered | 0 | 0 | Private | Computer c |
| User F | PasswordF | 0 | 5 | Registered | 0 | 0 | Private | Computer d |
| User G | PasswordG | 0 | 6 | Unregistered | - | - | - | - |
| User H | PasswordH | 0 | 7 | Unregistered | - | - | - | - |
| User I | PasswordI | 0 | 8 | Registered | 0 | 0 | Private | Computer g |
| ... | ... | ... | ... | ... | ... | ... | ... | ... |

FIG.18

| User Name | Password | Virtual LUN | Internal LUN | Port Number | Target ID | Attribute |
|---|---|---|---|---|---|---|
| User A | PasswordA | 0 | 0 | 0 | 0 | Private |
| User B | PasswordB | 0 | 1 | 0 | 0 | Private |
| User C | PasswordC | 0 | 2 | 0 | 0 | Private |
| User D | PasswordD | 0 | 3 | 0 | 0 | Private |
| User E | PasswordE | 0 | 4 | 0 | 0 | Private |
| User F | PasswordF | 0 | 5 | 0 | 0 | Private |
| User G | PasswordG | 0 | 6 | - | - | - |
| User H | PasswordH | 0 | 7 | - | - | - |
| User I | PasswordI | 0 | 8 | 0 | 0 | Private |
| ... | ... | ... | ... | ... | ... | ... |

FIG.19

| Port Number 1322 | Target ID 1323 | Virtual LUN 1324 | Internal LUN 1325 | WWN 1321a | S_ID 1321b | Use Status 1328 | Attribute 1326 |
|---|---|---|---|---|---|---|---|
| 0 | 0 | 0 | 0 | WWNa | S_IDa | Used | Private |
| 0 | 0 | 0 | 1 | WWNb | S_IDb | Used | Private |
| 0 | 0 | 0 | 2 | WWNf | S_IDf | Used | Private |
| 0 | 0 | 0 | 3 | WWNe | S_IDe | Used | Private |
| 0 | 0 | 0 | 4 | WWNc | S_IDc | Used | Private |
| 0 | 0 | 0 | 5 | WWNd | S_IDd | | Private |
| 0 | 0 | 0 | 6 | - | - | | Private |
| 0 | 0 | 0 | 7 | - | - | | Private |
| 0 | 0 | 0 | 8 | WWNg | S_IDg | Used | |
| .. | .. | .. | .. | .. | .. | .. | .. |
| .. | .. | .. | .. | .. | .. | .. | .. |

| User Name (2531) | Password (2532) | WWN (2523) |
|---|---|---|
| User A | PasswordA | WWNa |
| User B | PasswordB | WWNb |
| User C | PasswordC | WWNc |
| User D | PasswordD | WWNd |
| User E | PasswordE | WWNe |
| User F | PasswordF | WWNf |
| User G | PasswordG | WWNg |
| User H | PasswordH | WWNh |
| User I | PasswordI | WWNi |
| ⋮ | ⋮ | ⋮ |

253

METHOD AND SYSTEM OF MANAGING AN ACCESS TO A STORAGE SYSTEM IN A COMPUTER SYSTEM

This is a continuation application of U.S. Ser. No. 09/523,379, filed Mar. 10, 2000 now U.S. Pat. No. 7,082,462.

BACKGROUND OF THE INVENTION

This invention is related to a Computer System having more than one Computer. This invention, especially, is related to the management method for Storage Subsystem in the Computer System wherein said Storage Subsystem is shared by more than one Computers.

The Computer System with which more than one user perform their business using more than one Client Computer is called a Client Computer System. Up to now, a Client Computer System is constructed with the Computers such as Personal Computers (PCs) in which all computational processings can be individually executed. The Computer which is used in such a Client Computer System is a kind of universal machine equipped with a highly efficient CPU, a large-capacity memory, large-capacity hard disk device and a high-speed graphic function, etc. and is therefore called by a popular name "Fat Client". The Client Computer System composed of the Fat Clients is also called Fat Client System (FCS). In FCS, more than one Fat Client are mutually connected via LAN (Local Area Network), and communicate (transfer files, for example) each other depending on their requirements. The Fat Client is generally equipped with local disk units to store Operating System (OS), application programs or user data and so on. The OS and/or application programs are usually installed by user himself. The user data stored in their Client disk units is duplicated as backup data to a-backup device such as the tape device installed in somewhere in the LAN so as not to be lost owing to an unexpected fault of the disk unit.

An another popular example of the Client Computer System is the Network Computer System. A Computer which composes Network Computer System is called an Network Computer (NC). As an NC, Computer with low price and low function and without disk units to store OS or application programs is used. Such a Computer is called "Thin Client" as compared with the Fat Client. The Client Computer System having the Thin Clients is called Thin Client System (TCS). In the TCS, for example, in more than one NC are connected to a server which is equipped with the Storage Subsystem such as the hard disk device via a LAN. The OS, application programs used by the NC system, and user data are stored in the. Storage Subsystem linked with the server. The NC mounts the Storage Subsystem of the server as a remote Storage and makes use of the programs and data stored there. The OS which works on the NC, also, is loaded via a LAN from the Storage Subsystem of the server.

SUMMARY OF THE INVENTION

In the TCS as typically seen in the Network Computer System, inevitable are the overhead of the LAN processing and that of the control operation of the remote disk which occurs at both end of the NC and the server, because all disk accesses by users accompany accesses to the server via a LAN. Therefore, it is afraid that, in the TCS, the operational performance will be decreased seriously compared to the traditional Fat Client System, wherein each Client accesses its own built-in disk unit. Besides, because all accesses to the disk units are concentrated on the server, very high performance of CPU and Input/Output processing efficiency are required for the server, an expensive server is required to operate the Client Computer System.

The object of the present invention is to solve the problems inherent to such conventional technique, to reduce the overhead to access the disk units in the Client Computer System, and to realize high-speed access to the disk units.

Another object of the present invention is to also reduce the load of the LAN and the server to which the Client Computer is connected in the Client Computer System.

To achieve these objects, the system embodied by this invention consists of more than one Computer and a Storage Subsystem connected to said Computers. The Storage Subsystem contains more than one Storage Unit, the Management Table which registers the information which manages more than one Storage Unit accessible by each of Computers and a Control Unit which controls the accesses to said Storage Units from said Computers according to the information contained in the Management Table. In a preferred embodiment of this invention, the Management Table maintains the identity information of each Storage Unit to which an access by each Computer is permitted corresponding to the addressing information which identifies each accessing Computer. The setting of these information into the Management Table is executed by the control of the Management Console which is connected to the Storage Subsystem. In one of the embodiments of this invention, the setting of the information into the Management Table by the Management Console is executed by an administrator during the initial setting of the Computer System. After that, each Computer becomes permitted to access the prearranged Storage Units. In another embodiment of this invention, the Management Console sets information to the Management Table based on the identity information which is sent during the Boot-up processing of each Computer. By this method, for example, the users of the Computers and the Storage Units access to which by the Computer is permitted in accordance with the environment of the Computer can be switched.

The other characteristic and effect of this invention will be explained by the following drawings and detailed descriptions.

BRIEF DESCRIPTION OF THE DRAWINGS

FIG. 4 shows the form of an example of the LUN Management Table in the 1st embodiment example of the present invention.

FIG. 8 shows the form of the LUN Management Table in the 2nd embodiment example of the present invention.

FIG. 12 shows the form of the LUN Management Table in the 3rd embodiment example of the present invention.

FIG. 13 shows the form of an example of the User-LUN Management Table.

FIG. 18 shows the form of an example of the User-LUN Management Table in the 4th embodiment example of the present invention.

FIG. 19 shows the form of an example of the LUN Management Table in the 4th embodiment example of the present invention.

FIG. 21 is shows the form of an example of the User-WWN Management Table.

DESCRIPTION OF PREFERRED EMBODIMENTS

Figure 1:
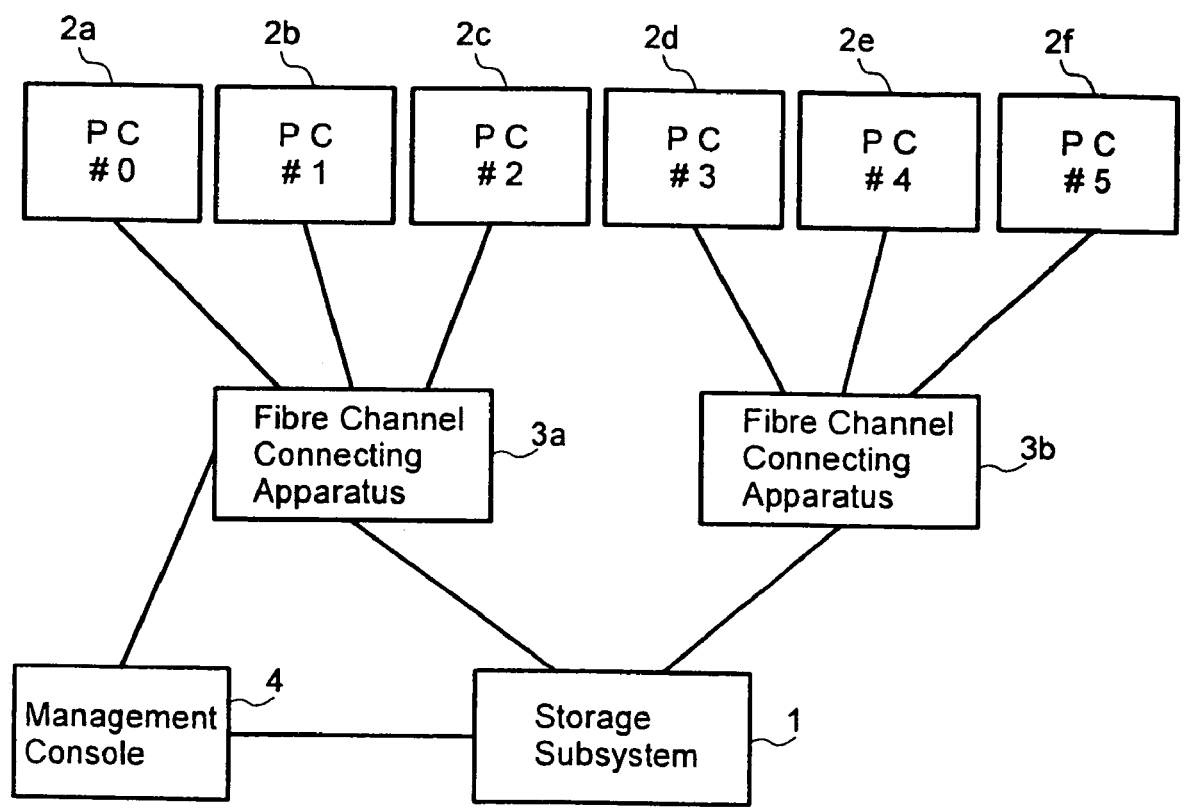
FIG. 1 is the block diagram which shows the configuration of the Computer System in the 1st embodiment example of the present invention.

FIG. 1 is the block diagram which shows schematically the configuration of the Computer System in the 1st embodiment of the present invention. The Computer System in this embodiment has more than one Computer. In the present embodiment, so-called Personal Computers (PCs) 2a, 2b–2f are supposed to be used as the Computers. The PCs 2a, 2b–2f are the disk-less PCs which have no hard disks inside them. The PCs 2a, 2b, and 2c are connected to the Storage Subsystem 1 via the Fibre Channel Connecting Apparatus 3a, and PCs 2d, 2e, and 2f are connected to the Storage Subsystem 1 via the Fibre Channel Connecting Apparatus 3b. The Management Console 4 which is used for the management of the Computer System is connected to the Storage Subsystem 1. The Management Console 4 is also connected to the PCs 2a, 2b, and 2f via the Fibre Channel Connecting Apparatus 3a. In this embodiment example. Fibre Channel is used as the interface among the PCs, the Management Console 4, and the Storage Subsystem 1 and communication among the devices is supposed to be done according to the protocol conforms to the SCSI standards.

Figure 2:
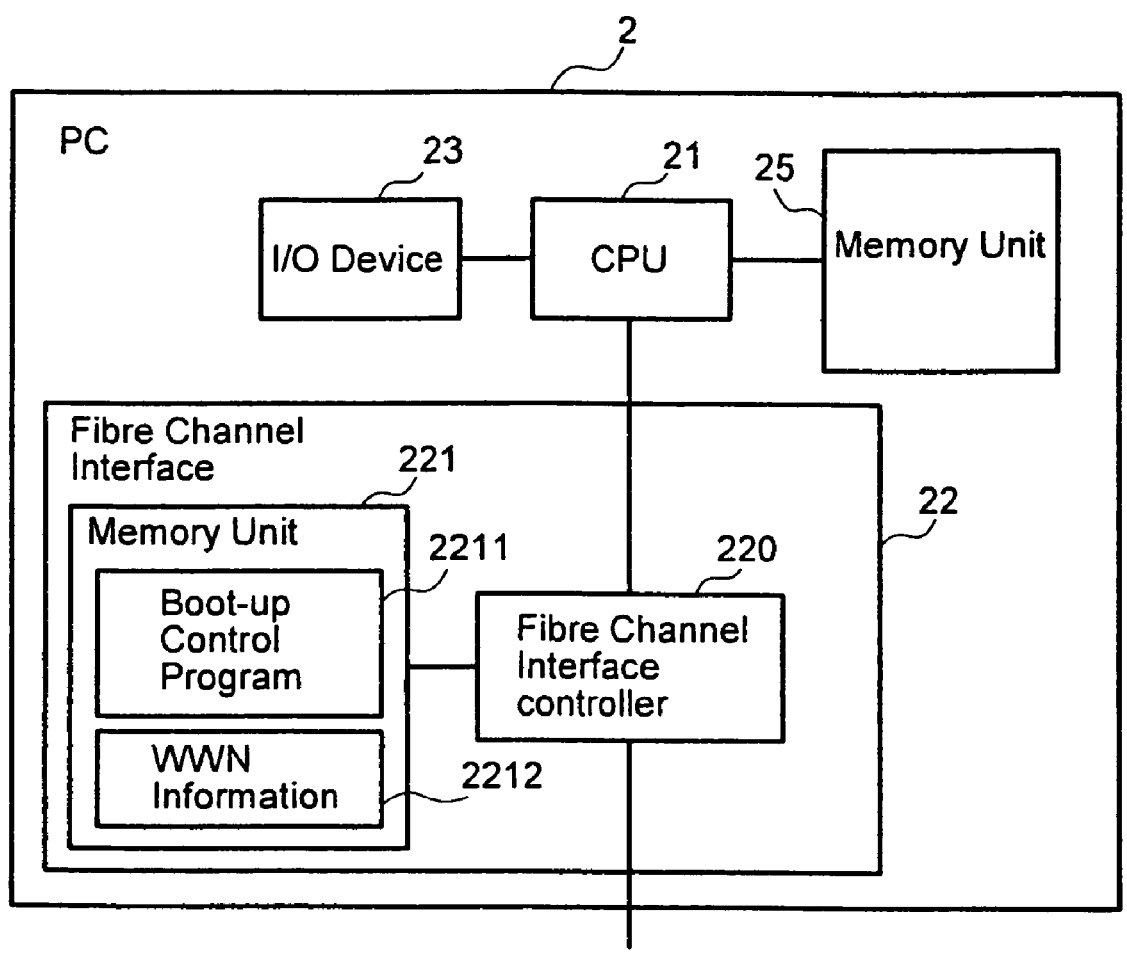
FIG. 2 is the block diagram which shows the configuration of the PC in the 1st embodiment example of the present invention.

FIG. 2 is the block diagram which shows schematically the configuration of PC 2. Each PC 2 has the Central Processing Unit (CPU) 21 which controls entire PC 2 and does various computational works by executing programs, Fibre Channel Interface (Fibre Channel I/F) 22 to connect the PC 2 to the Fibre Channel, I/O Device 23 used as an interface with the user, and Memory Unit 25 to store the programs executed by the CPU 21. The Fibre Channel I/F 22 is composed of Fibre Channel Interface controller 220 to control the Fibre Channel processing, and Memory Unit 221 to store programs and data needed for the Fibre Channel Interface controller 220 to perform the control functions and for the CPU 21 to control the Fibre Channel Interface controller.

In the Memory Unit 221 contained are the Boot-up Control Program 2211 to be executed by the CPU 21 to control the Fibre Channel Interface controller 220 when the OS is activated by the Storage Subsystem 1 via the Fibre Channel and World Wide Name (WWN) 2212 which is an unique name to identify the Fibre Channel I/F 22.

The Boot-up Control Program 2211, which is called "Extended BIOS", is the program which extends the function of PC 2. Thanks to this booting program, OS can be booted up from the Storage Subsystem connected to the Fibre Channel and located outside of the Computer 2. When using Computers other than PC, the Boot-up Control Program 2211 is maintained in Memory Unit 25.

Figure 3:
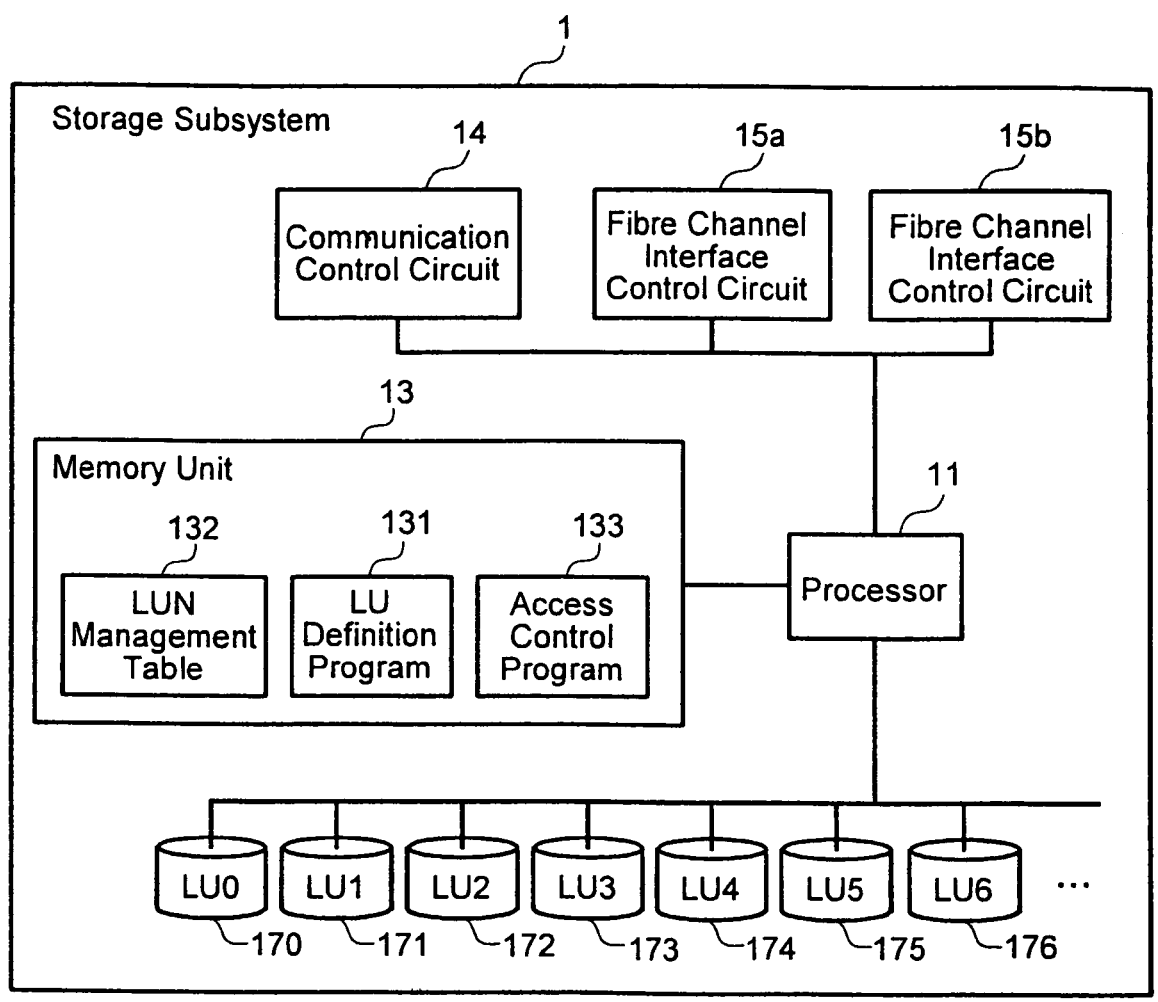
FIG. 3 is the block diagram which shows the configuration of the Storage Subsystem in the 1st embodiment example of the present invention.

FIG. 3 is the block diagram which shows schematically the configuration of the Storage Subsystem 1. The Storage Subsystem 1 is equipped with Processor 11, Memory Unit 13, Communication Control Circuit 14 to control the communication with the Management Console, Fibre Channel Interface controller 15a and 15b to connect the Storage Subsystem 1 to the Fibre Channel Connecting Apparatus 3a and 3b respectively, and Logical Units (LUs) 170 through 176 storing programs and data utilized by the PC 2. LUs 170 through 176 is a logically formed storage areas in the Storage Subsystem and do not necessarily correspond to the physical Storage Units with one-to-one correspondence. That is, in addition to the case where one physical Storage Unit composes one LU, one Storage Unit can compose more than one LU,-or more than one physical Storage Unit may compose only one LU. Each of LUs 170 through 176 is recognized as one Storage Unit by a Host Computer. For the physical Storage Unit to compose LU170 through 176, the magnetic disk unit can be used for example. Memory Unit 12 stores LU Definition Program 131, LUN Management Table 132, and Access Control Program 133. The Processor 11 executes the LU Definition Program 131, defines LU170 through 176 following the instructions sent from the Management Console 4, and sets related information in the LUN Management Table 132. The Processor 11 executes the Access Control Program 133 in response to the access request from the PC 2 to control the accessibility of LUs 170 through 176. The accessibility control of LU 170 through 176 is executed based on the information maintained in the LU Management Table 132.

Each of the LUs 170 through 176 is given a specific number called Logical Unit Number (LUN) to be uniquely identified. Usually, the Computer including PC searches a Storage Subsystem for available LUs during the OS Boot-up. The search procedure is executed traditionally on quite a limited conditions as explained below, (a) LUNs are searched sequentially starting from LUN0, (b) search is stopped when a missing LUN is encountered, assuming that the LUNs should exist sequentially.

In this embodiment example, accessible LUs are allocated for each PC 2. Therefore, the sequential LU numbers beginning from 0 must be given to the LUs allocated for each PC 2. However, when allocating LUNs in such a way, LUNs overlap each other and become unable to be identified in the Storage Subsystem. In this embodiment example, inside the Storage Subsystem 1, the LU170 through 176 are allocated sequential number beginning with 0 (called Internal LUN) and yet the PC 2 may recognize each LU by another number (called Virtual LUN) independent of the Internal LUN. As for the Virtual LUN, the sequential numbers beginning with 0 are allocated for each PC 2. The correspondence relation between the Internal LUN and Virtual LUN is managed by the LUN Management Table 132.

FIG. 4 shows the form of an example of the LUN Management Table 132. The LUN Management Table 132 contains Computer Identifier 1321 to identify PC 2 and Management Console 4 individually and Port Number 1322, Target ID 1323, Virtual LUN 1324, Internal LUN 1325 and Attribute 1326 corresponding to said Computer Identifier 1321.

The Computer Identifier 1321 defines the information to specify a PC 2 which owns (uses) the certain LU. In this embodiment example, the Computer Identifier 1321 is defined by the combination of Port Name based on the WWN information 2212 of the Fibre Channel I/F 22 of the PC 2 and S_ID (Source-ID) which is fixed in an initialization procedure of the Fibre Channel. The S_ID is the ID information stored in a frame header of the Fibre Channel and it is an ID to identify the sauce (Initiator) which generated the frame. The value of the S_ID is dynamically assigned during the initialization process of the Fibre Channel. When SCSI (Small Computer Systems Interface) is used as an interface between PC 2 and Storage Subsystem 1, SCSI ID can be used as the Computer Identifier 1321. For the Port Number 1322, the number of the connection port of the Fibre Channel Interface controller 15 connecting to the PC 2 identified by the Computer Identifier 1321 is set. For the Target ID 1323, the ID information of Storage Subsystem 1 of the interface to which the PC 2 is connected is set. In this embodiment example, it is assumed that each Port has only one D-ID (Destination-ID) in the Fibre Channel used as the interface between PC 2 and Storage Subsystem 1. Therefore, the Storage Subsystem 1 can be identified by means of the Port Number. In such a situation, the Target ID 1323 may be omitted or the D-ID defined when the Fibre Channel is initialized may be used. Where SCSI is used as the interface, each current ID can be assigned as the Target ID, because each port may have more than one ID. In this embodiment example, the Target ID 1323 is set to 0 uniformly and the Storage Subsystem 1 is identified by means of the Port Number 1322. The Virtual LUN 1324 and the Internal LUN 1325 define correspondence between the Internal LUN and Virtual LUN of the LU allocated to the PC 2. For the Attribute 1326 defines how an owner PC 2 may access each LU. The "Private" means that one PC 2 may access the LU exclusively. The "Shared" means that the LU is shared by more than one PC 2. The "Privileged" means that the LU is in a special management status, that is, in this embodiment example, the LU is accessible only by the Management Console 4. Hereinafter, the LU having "Private" Attribute is called "Private LU" and the LU having "Shared" Attribute is called "Shared LU". For example, in FIG. 4, the PC0 2a connected to the Port 0 is allocated with LUs whose LUNs are 0 and 1, and the Virtual LUNs recognized by the PC 2a are 0 and 1 respectively.

Figure 5:
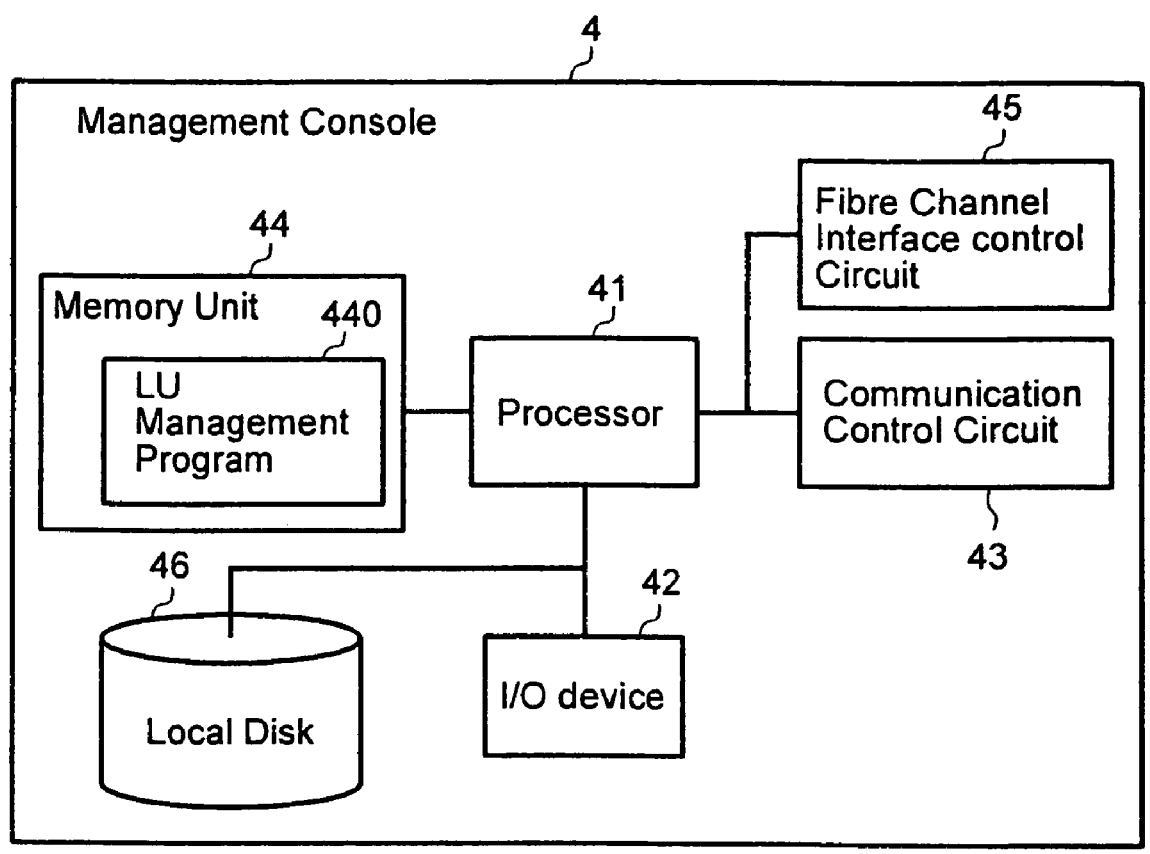
FIG. 5 is the block diagram which shows the configuration of the Management Console.

FIG. 5 is a block diagram which shows schematically the configuration of the Management Console 4. The Management Console 4 consists of, Processor 41 to control the entire Management Console, I/O Device 42 used as an interface with an administrator, Communication Control Circuit 43 to communicate with the Storage Subsystem 1, Memory Unit 44 storing the LU Management Program 440 executed by the Processor 41, Fibre Channel I/O Control Circuit 45 to execute connecting with and control of the Fibre Channel, and Local Disk Unit 46 storing Programs and OS for the Processor 41.

The LU Management Program 440 issues an order to create LU, gives the correspondence between the each Internal LUN and Virtual LUN, and sets limit on accessibility for each LU.

Hereinafter, various processing related to the embodiment of the present invention will be explained.

[Creation of the LU]

The processing to define LU by controlling Storage Subsystem 1 from Management Console 4 is done according to the following procedure. An administrator selects a physical disk unit on which the LU is to be created through the I/O Device 42 of the Management Console 4. When the Storage Subsystem 1 is equipped with more than one disk unit, one of them is selected. When RAID (Redundant Arrays of Inexpensive Disks) is configured with more than one disk unit, more than one disk unit are selected. The Management Console 4 groups the selected disk units and handles them as one virtual physical disk unit. Next, the administrator decides the capacity of the LU to be created on the selected physical disk units and inputs the capacity of each LU and LUN (Internal LUN) assigned to the LU from the I/O Device 42. When these information are set, the Management Console 4 transfers the set information to the Storage Subsystem 1 in response to the request from the administrator. The transfer of the set information is done via the Communication Control Circuit 43.

The Communication Control Circuit 14 of the Storage Subsystem 1 receives the set information sent from the Management Console 4 and feeds the information to the processor 11. The processor 11 executes the LU Definition Program 131 and creates LU with the specified capacity on the physical disk unit according to the setting information. Then, it registers the set LUN in the Internal LUN 1325 column in the LUN Management Table 132. At this time, the "Privileged" is set for the Attribute 1326 of each LU and the other columns are left "Undefined". When the creation of LU succeeds, the processor 11 reports that the LU creation succeeded to the Management Console 4 through the Communication Control Circuit 14.

Following the creation of the LUs, the administrator allocates LUs to the PC 2. The administrator specifies LUN of the LU to be allocated to the PC 2 and sets, WWN information of the PC 2 to which the LU is allocated, Virtual LUN, Port Number of the Port to which the PC 2 is connected, and Attribute which defines whether the LU is allocated to the PC 2 in the manner exclusive or shared.

The processor 41 in the Management Console 4 transfers the set information to the Storage Subsystem 1 through the Communication Control° Circuit 43. Based on the received information, the Processor 11 in the Storage Subsystem 1 establishes the related information corresponding to the specified Internal LUN. The LU having Attribute specified as "Private" is allocated to only one PC. On the other hand, one PC may have more than one Private LU allocated. For the LU given the attribute "Shared", different Virtual LUN may be set for each PC.

[Access Control]

When the PC is started, it executes the initialization processing including the following two steps.

The first processing is the Port Log-In processing which is executed when the Fibre Channel is initialized. This processing is executed to establish the required connections on the Fibre Channel. Through this processing, the Fibre Channel I/F Control Circuit 15 in the Storage Subsystem 1 obtains the WWN information which is the Port Name of the accessible PC 2 and its corresponding S_ID. The LU Definition Program 131 compares the obtained WWN with the WWN information of each PC 2 stored in the LUN Management Table 132 as the Computer Identifier 1321 and registers the corresponding S-ID. Since then, only the S_ID is used to identify the PC 2.

The 2nd processing is the LU search processing which is executed when the SCSI interface is initialized. The Fibre Channel I/F 22 checks all Storage Units for the presence/absence of LU to find out LUs ready to be Booted-up by executing Boot-up Control program 2221. In this check processing, the Inquiry Command specified by the SCSI standard is used with the value of LUN varied sequentially. The detected LU is recognized by the Boot-up Control Program 2221 as one of the Bootable LUs and also it is recognized by the OS in PC 2 as one of the usable LUs. When the Fibre Channel I/F Control Circuit 15 in the Storage Subsystem 1 receives the Inquiry Command from PC 2, it notifies the processor 11 of the S_ID which issued the Command and the targeted Virtual LUN. Processor 11 executes the Access Control Program 133 and processes the Inquiry Command. Specifically it refers to the LUN Management Table 132 and checks whether or not the LUN specified by the Inquiry Command is set as the Virtual LUN 1324 of the PC which issued the Command. If the LUN specified corresponding to the PC which issued the Command is set as the Virtual LUN 1324, the check result proved to be valid and the information which shows that LU exists as the result of the Inquiry Command is transferred to the PC 2. On the other hand, if the specified LUN is not set as the Virtual LUN 1324 of the PC concerned, the information which shows that LU does not exist such as "No Device" response is transferred to the PC 2. By means of this LU check, only the LU access to which by PC 2 is permitted is recognized by the PC 2 and other LU whose Virtual LUN is not linked with the PC is not recognized by the PC. With this, accesses to the LU by each PC 2 can be exclusively controlled.

Hereinafter, each access is executed depending only upon the relation which is defined by LUN Management Table 132 basically. An exceptional access may be done by the PC 2 outside of the permitted range, such invalid access can be refused by checking the relationship of the S_ID and Virtual LUN as mentioned above. When permitted access defined by the LUN Management Table 132 is issued by the PC, the Access Control Unit 16 executes issued Command such as Read/Write.

[Processing the Attribute "Privileged"]

An administrator can prohibit a PC 2 from accessing to the LU temporarily by setting the Attribute of "Privileged" to a specified LU using the Management Console 4 and can operate the LU through the Management Console 4. For example, in a backup processing of the data which is stored in a certain LU, the administrator sets the Attribute of the LU to be backed up to "Privileged" and the administrator prohibits any PC 2 from accessing to the LU temporarily. The Management Console 4 accesses this LU using Fibre Channel I/F Control Circuit 45 and backs up the stored data into a backup device (not shown) which is prepared in the system. After the backup processing is finished, the Management Console 4 returns the Attribute of the LU to the original one and enables PC 2 to access the LU. In the same way, the administrator can execute processing such as the installation or version-up of the OS and/or application program which is used by the PC 2. For example, when installing OS initially, the administrator sets "Privileged" for the Attribute of the LU to be installed through the Management Console 4 and executes the pre-installation work. After that, the administrator returns the LU Attribute to the original one. When each PC 2 is started up next time, it can be used in the new environmental by setting information such as hardware information specific to the PC 2 and user registrations. Also, when the version-up of OS or the application program is required, the administrator can execute these processing through the Management Console 4 same way as in the installation.

[OS Boot-up]

The OS program which PC 2 uses is stored in a specific LU (usually, LU of Virtual LUN=0) which is allocated for each PC 2. Each PC 2 executes the initialization of the Fibre Channel when it is initiated. At this time, CPU 21 executes the Boot-up Control Program 2211 which the Fibre Channel I/F 22 has and recognizes connected LUs. The Boot-up Control Program 2211 executes the Boot-up processing emulating the LU of the Virtual LUN=0 specified as the LU for Boot-up device as if it was a internally built-in disk unit. This control is called Boot Emulation. The way of the Boot-up of the OS which is described here is the basically same in both cases of OS stored in the Private LU which is allocated to each PC 2 exclusively and OS stored in the Shared LU which is shared by more than one PC 2. However, even when the OS itself is stored in a Shared LU, set information such as the user license information, the individual information, and the various environmental information which becomes necessary for each PC 2 is stored in the Private LU which is allocated to each PC 2 exclusively. While sharing one OS by more than one user in this way, the different environment can be built for each user and yet any invalid access can be prevented, too. The OS which is stored in a Shared LU in this way and is used by more than one PC 2 is called Shared OS in this description of the present invention.

[Execution of the Application Program]

In each PC 2, LUs detected during each Boot-up processing are emulated like the built-in disk units, and therefore the PC 2 can execute application program and the data which are stored in them. When executing the application program which is stored in the LUs detected during the Boot-up procedure, the PC 2 reads at least a part of the application programs and load it onto the Memory Unit installed in the PC 2 from the LU to executes the programs. The user can store the application program in a Shared LU and execute the program from more than one PC 2. Generally, the application program itself is not modified during the execution of the program, and therefore, may be used without worrying about the exclusive control between accessing PCs. In this description of the present invention, an application program which is stored in a Shared LU and can be used among more than one PC 2 is called a Shared Application Program. When executing the application program, too, the setting information such as the user license information, the individual information, and various environmental information which is specific to each PC is necessary. These information is stored in a Private LU which is allocated to each PC 2 which uses a shared application program. Thus, the shared application program can be used in the various environments depending upon PCs. Also, any invalid access to the application program can be refused.

Figure 6:
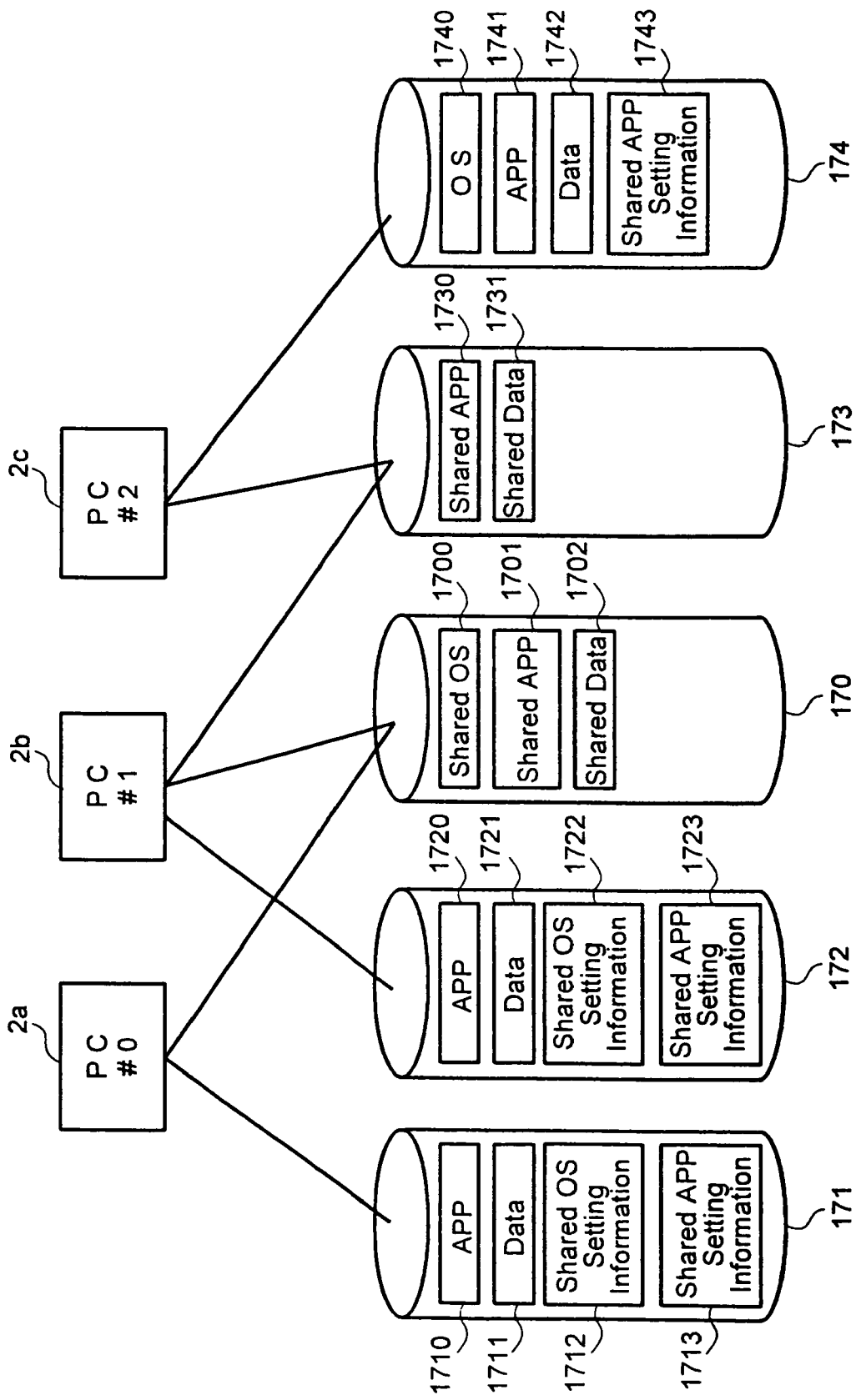
FIG. 6 is the schematic diagram which shows an example of a concrete allocation of LUs in the 1st embodiment example of the present invention.

FIG. 6 shows schematically an concrete example of the allocation of LUs to PCs. In the figure, the example of the allocation of LUs to PC 2*a* through PC 2*c* is shown. The relation between PCs and LUs illustrated in the figure shows the condition which is managed by the information maintained in the 1st through 7th lines of the LUN Management Table 132 shown in FIG. 4. The LU 170 (Internal LUN=0) is a Shared LU Shared by the PC 2*a* and PC 2*b* wherein stored are the Shared OS 1700, Shared Application Program 1701 and Shared Data 1702 commonly accessed by PC 2*a* and PC 2*b*. The PC 2*a* and PC 2*b* recognize LU 170 as an LU with Virtual LUN=0. The LU 171 (Internal LUN=1) and the LU 172 (Internal LUN=2) are the Private LUs of each PC 2*a* and PC 2*b* respectively wherein stored are the shared OS setting information 1712, 1722 and also shared application program setting information 1713, 1723 which are specific set information of each PC respectively. Also, the application programs 1710, 1720 and data 1711, 1712 which are exclusively used by PC 2*a* and PC 2*b* are stored in LUs 171, 172 respectively. The LU 171 and LU 172 are recognized as LU with Virtual LUN=1 respectively from PC 2*a* and PC 2*b*. The LU 173 (Internal LUN=3) is Shared LU by PC 2*b* and PC 2*c* wherein stored are the Shared Application Program 1730 and Shared Data 1731 which are used commonly by PC 2*b* and PC 2*c*. The LU173 is recognized by PC 2*b* as LU with Virtual LUN=2 and is recognized by PC 2*c* as LU with Virtual LUN=1. The LU 174 (Internal LUN=4) is a Private LU of the PC 2*c* wherein stored are OS 1740, Application Program 1741, and Data 1742 which are exclusively used by the PC 2*c*. In the LU 174 stored is the shared set information 1743 to be used when the PC 2*c* loads the Shared Application program 1730. The LU 174 is recognized as LU with Virtual LUN=0 by the PC 2*c*. Under such relations between PCs and LUs, the PC 2*a*, for example, loads the Shared OS 1730 using the Shared OS setting information 1712 and executes the Application Program 1710 and the Shared Application Program 1701. Also, the PC 2*c* loads the Private OS 1742 and executes the Application Program 1740 and the Shared Application Program 1730. By virtue of such relations between PCs and LUs the PC 2*c*, for example, can use OS with different version and or the different type in stead of the Shared OS 1700 as OS 1742, and thus, PC 2*c* can operate on OS different from the PC 2*a* and PC 2*b*.

According to the embodiment example of the present invention explained hitherto, one Storage Subsystem can be used by more than one PC. The program and the data stored in this Storage Subsystem can be directly accessed by each PC, therefore, unlike the conventional Network Computer System, any servers are not needed and overhead for the LAN processing nor the server processing are not accompanied. Therefore, the high-speed access to the disk storage can be realized. Also, the Storage Subsystem with high-speed, large capacity and high reliability, like Disk Array can be used in stead of the traditional built-in Disk Units in PC, resulting in the increased performance, flexible capacity expansion, and high reliability of the PC system. Moreover, because the OS, the application program, and the data can be concentrated in one Storage Subsystem, the maintenance of the storage can be intensively done and the reduction of the operational management cost can be achievable, too.

The OS or the Application Program used commonly among the PCs can be stored in the Shared LUs, and therefore the LUs which require the maintenance can be concentrated to the limited LUs and management cost may be also reduced. At the same time, the specific information to each PC may be stored in the Private LU and the individual environment can be also realized.

Figure 7:
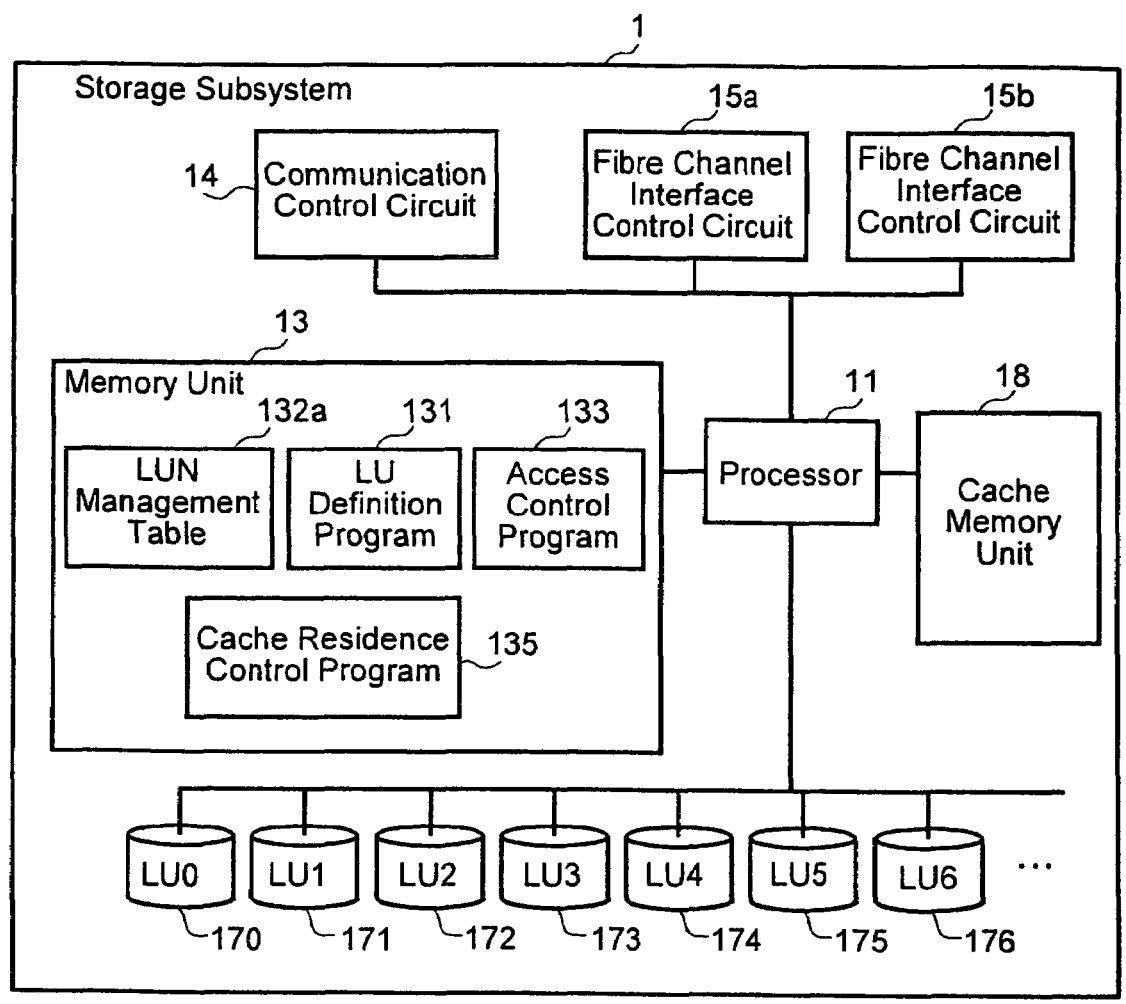
FIG. 7 is the block diagram which shows the configuration of the Storage Subsystem in the 2nd embodiment example of the present invention.

FIG. 7 is the block diagram which shows schematically the configuration of the Storage Subsystem which is used by the Computer System in the 2nd embodiment example of this invention. The configuration of the system in this embodiment is the same as that shown in FIG. 1 except partial difference in the configuration of the Storage Subsystem. Hereinafter, the explanation will be mainly focused on the difference from the 1st embodiment example.

According to the 1st embodiment example, when the Shared LU stores the Shared OS or the Application Program and more than one PC can access them, it is afraid that the performance of the Shared LU may be lowered in the case where accesses from the PCs concentrated on the Shared LU. To solve such a problem, the Storage Subsystem 1 of this embodiment example has Cache Memory Unit 18 and the Memory Unit 13 which stores the Cache Residence Control Program 135 to make data temporarily reside in the Cache Memory Unit 18.

The Cache Memory Unit 18 is usually the circuit which is composed of DRAM. The partial copy of the data which is stored in LUs 170 through 176 is also stored in the Cache Memory Unit 18. When a read access request is issued from PC 2, the Processor 11 transfers data to PC 2 from the Cache Memory Unit 18 without accessing disk unit if the copy of the data requested by the PC 2 exists (Cache Hit) in the Cache Memory Unit 18. When the Processor 11 accepts a write request from PC 2, it reports the PC 2 that the write processing is completed without accessing disk unit when write data is stored in the Cache Memory Unit 18. The write data written in the Cache Memory Unit 18 in this way is written back to the LU asynchronously with the processing of the write access. This write back processing is called Delayed Write. The Cache Residence Control Program 135 controls the Cache Memory Unit 18 in response to the accessing request from the PC 2. The Cache Residence Control Program 135 realizes control operation to continue keeping at least a portion of data of Shared LU stored in the Cache Memory Unit 18 once the data is stored in, the Cache Memory Unit 18.

FIG. 8 shows a form of the LUN Management Tables 132*a* in the embodiment of the present invention. As for the LUN Management Tables 132*a* in this embodiment example, Cache Attribute 1327 is added to the LUN Management Table 132 in the 1st embodiment example. The Cache Attribute 1327 is specified through the definition and creation of LU from the Management Console 4 by the administrator. To data in an LU whose the Cache Attribute 1327 is set to "Usual", for data in a LU, the Cache Memory Unit control using the conventional LRU (Least Recently Used) algorithm is applied. On the other hand, concerning data of the LU whose Cache Attribute 1327 is set to "Residence", once it is stored in the Cache Memory Unit 18, the Cache Residence Control Program 135 does not abandon it but keeps it stored in the Cache Memory Unit. For example, suppose a case, as shown in FIG. 8, where the "Residence" Attribute is given to the LU shared by PCs 2. In this case, if a certain PC uses the Application Program or the Data which is stored in the LU, it is stored in Cache Memory Unit 18 and kept maintained in the Cache Memory Unit 18. After that, when another PC uses this Application Program or Data, the targeted Data is always hits the Cache Memory Unit and therefore, can be accessed at high-speed. On the other hand, if the Cache Memory Unit control is performed depending upon the LRU algorithm, the program or data which has been stored in the Cache Memory Unit 18 once may be replaced with the other data or program if they are not accessed for a long time. In this case, when another PC attempts to use the program or data, the data must be staged to the Cache Memory Unit 18 again and the Cache Memory Unit doesn't work effectively.

Here explained was the setting of the Cache Attribute of the Shared LU to "Residence" as an example, however, it is really feasible to set the "Residence" Attribute for the Private LU provided that the Cache Memory capacity is enough or some specific PCs 2 are intended to be speeded up.

According to this embodiment example of the present invention, a part or entire data stored in a Shared LU can be mad resident in the Cache Memory Unit. By this method, since the Shared Application Program and or Shared OS program can be resident in the fast Cache Memory Unit, once those data are used by some PC, then any PC can access them with very high-speed, after that. Also, because the Cache Memory Unit which is by far the faster compared with the disk, unit can be utilized, each PC can enjoy higher access speed compared to the case where each PC stores OS and an application program in its built-in disk unit.

In two examples of the embodiment of this invention, the management of LU is done on the PC basis, however, hereinafter, the case where the management of LU is done depending upon the user who uses the Storage Subsystem.

Figure 9:
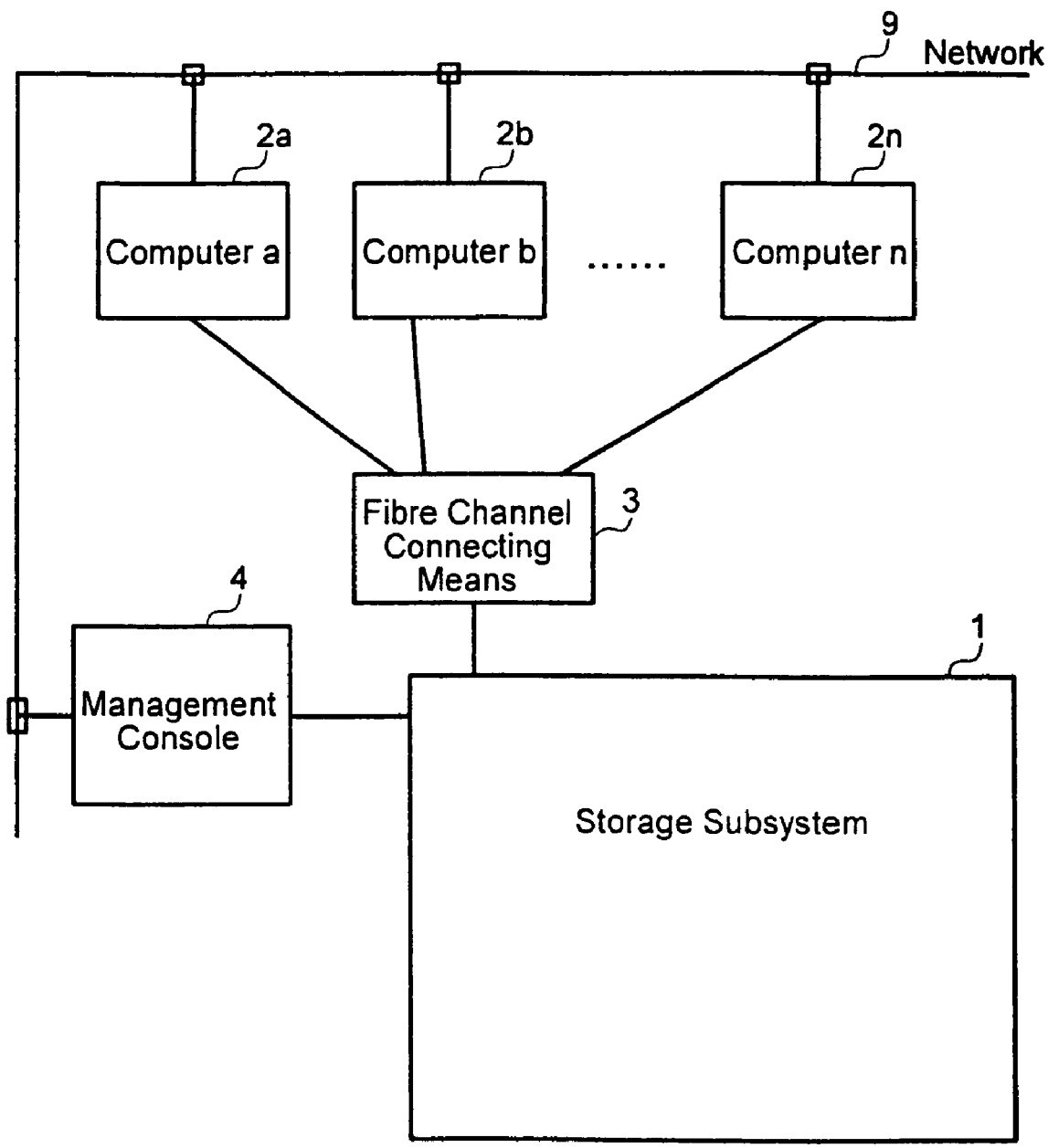
FIG. 9 is the block diagram which shows the configuration of the Computer System in the 3rd embodiment example of the present invention.

FIG. 9 is the configuration of the Computer System in the 3rd embodiment example of the present invention. The Computer System in this embodiment example is different from the above mentioned embodiments, as each PC 2 and the Management Console 4 are connected with each other via the Network 9 in this embodiment. Each PC 2 can exchange data via the Network 9. In this figure, only one Fibre Channel Connecting Apparatus 3 is shown and every PC 2 is connected to the Storage Subsystem 1 via this Fibre Channel Connecting Apparatus 3, however, more than one Fibre Channel Connecting Apparatus 3 may be used like the above mentioned embodiment examples. As for the configuration which corresponds to the above mentioned embodiment examples, the reference numbers already explained are used again and detailed explanation of them will be omitted in the following explanation. Incidentally, the PC 2 and the Management Console 4 are partially different from those in above mentioned embodiment examples, however, here, they are explained using the same reference numbers.

Figure 10:
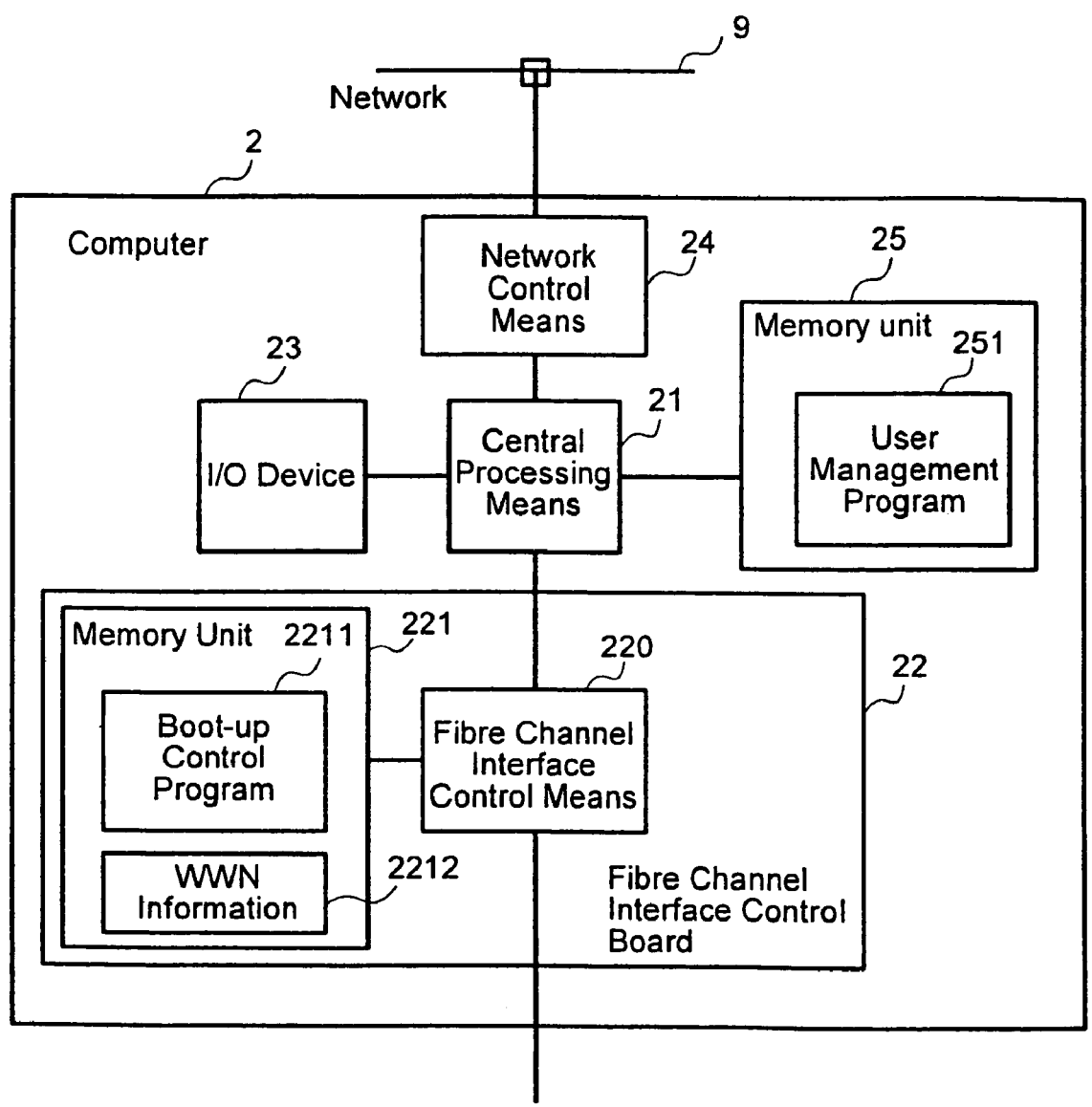
FIG. 10 is the block diagram which shows the configuration of the PC in the 3rd embodiment example of the present invention.

FIG. 10 is the configuration of the PC 2 used in this embodiment example. The PC 2 in this embodiment example is different from that explained in the 1st embodiment example, wherein the PC 2 has the Network Control Means 24 to control communication via the Network 9 and has User Management Program 251. The User Management Program 251 is the program which is executed by CPU 21 to manage users who uses the PC 2 and is stored in the Memory Unit 25. The User Management Program 251 can be installed as an extended BIOS function of the PC 2. Also, when WS is used as the Computer, the User Management Program 251 can be loaded as a part of the initialization program.

Figure 11:
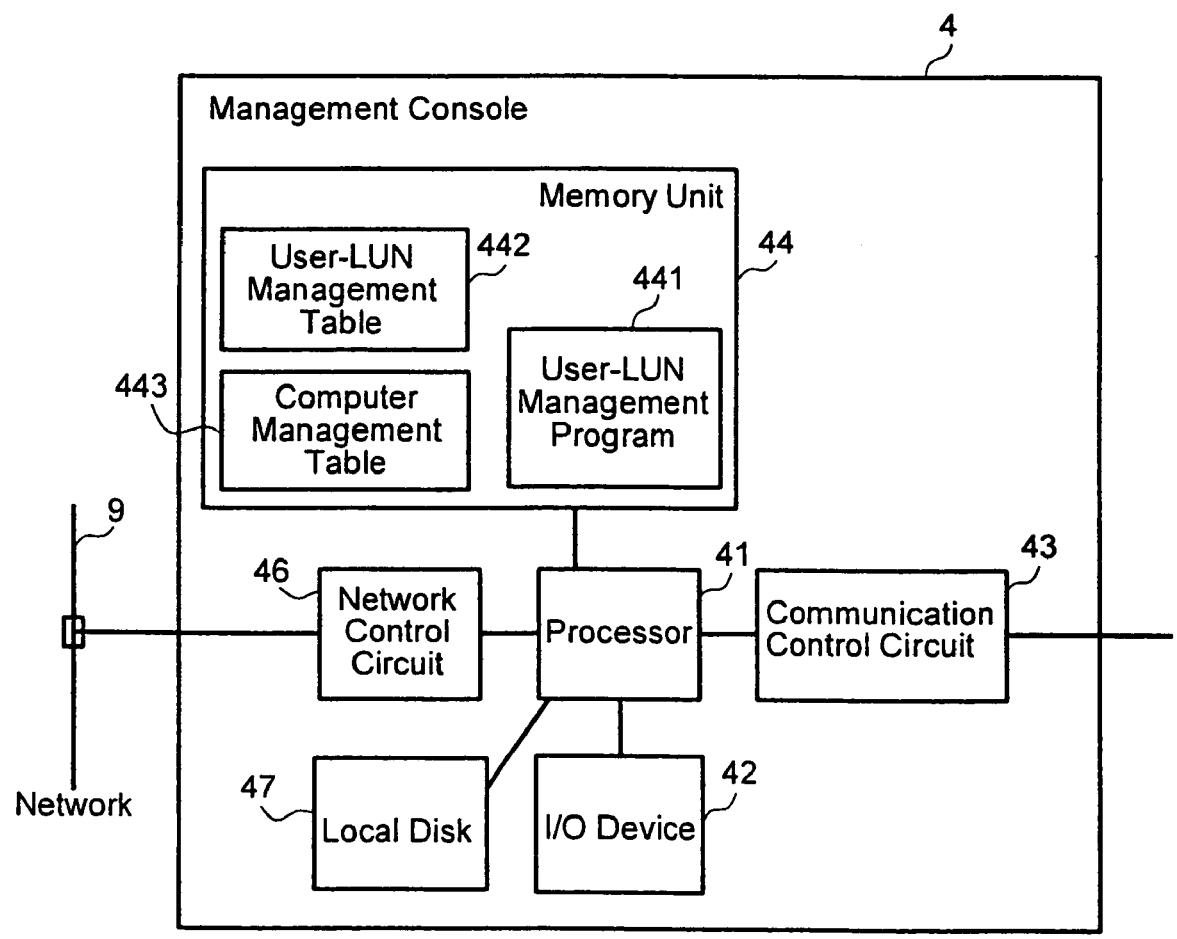
FIG. 11 is the block diagram which shows the configuration of the Management Console 4 in the 3rd embodiment example of the present invention.

FIG. 11 shows the configuration of the Management Console 4 in this embodiment example. The Management Console 4 in this embodiment example is composed basically the same as the Management Console in the 1st embodiment example. The Management Console 4 in this embodiment example has User-LUN Management Program 441 to manage LU on the user level, in stead of the LU Management Program 440 in the 1st embodiment example, as the program which is executed by the processor 41. Additionally, in the Memory Unit 44 stored are the User-LUN Management Table 442 to manage the LUN corresponding to the LU which can be used by each user and Computer 5 used by each user, and the Computer Management Table 443 to manage the relation between the PC 2 and the WWN 2212 which is set for by the Fibre Channel Interface Controller 220 installed in said PC 2.

FIG. 12 shows the form of the LUN Management Table which is maintained in the Memory Unit 13 of the Storage Subsystem 1 in this embodiment example. In this FIG. 12, the WWN 1321a and S_ID 1321b are used to express the Computer correspondence of the Identifier 1321 in the LUN Management Table in the 1st embodiment example. When the WWN with S_ID is given, the PC 2 which is a higher level device can be identified by checking only said S_ID without checking the WWN each time a frame is received. Incidentally, too, the Target ID is unused and 0 is uniformly set in the Target ID 1323 area in this embodiment example.

FIG. 13 shows a form of an example of the LUN Management Table 442 equipped in the Management Console 4. In this embodiment example, it is assumed that, there exist at least one or more users who use the Computer System and each user can use any requested PC 2. Each user can have one or more LUs each of which has specifically tailored environment for him. In the following explanation, for simplicity each user is assumed to have one Private LU respectively exclusive to him. The relation of an User and LU occupied by the user is managed by the User-LUN Management Table 442. In the figure, User Name 4421 is an identity name which specifies a user. Password 4422 is the authentication code to authenticate whether or not the user is authenticated. The Virtual LUN 4423 is the LUN which is recognized by the PC 2 used by each user at certain time. The Internal LUN 4424 is the internal LUN of the LU used by each user exclusively. The Registration Status 4425 shows whether or not the Private LU allocated to one user is actually registered in the Storage Subsystem 1 to be accessible by PC 2 used by the user. The Port Number 4426, Target ID 4427, and the Attribute 4428 are same as those in the LUN Management Table 132. The Computer Name shows the name of the PC2 which certain user is using at present.

Figure 14:
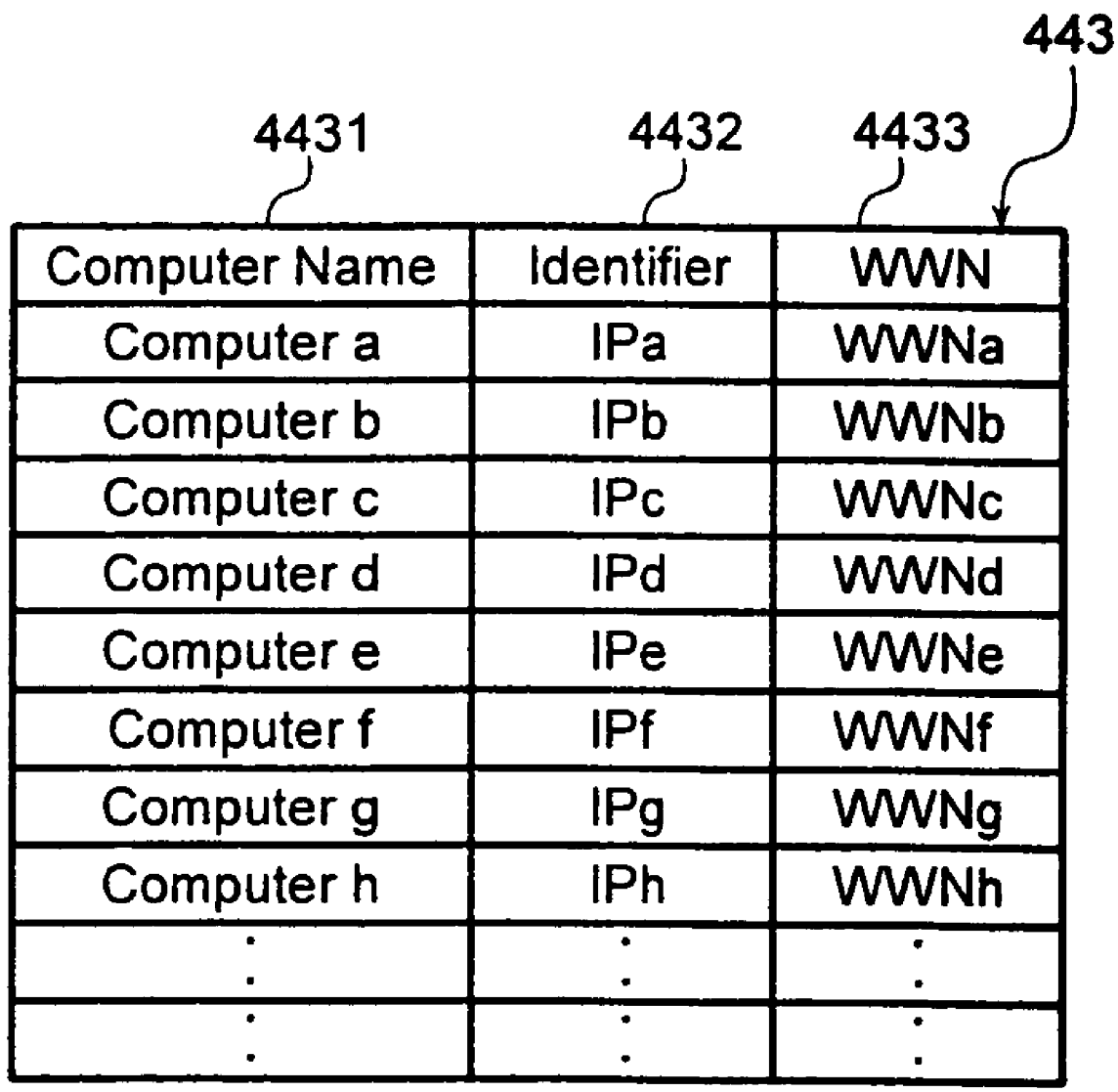
FIG. 14 shows the form of an example of the Computer Management Table.

FIG. 14 shows a form of an example of the Computer Management Table 443 equipped in the Management Console 4. The Computer Management Table 443 has columns for Computer Name 4431, Identifier 4432, and WWN 4433. The Computer Name 4431 is the name to identify each PC 2. The Identifier 4432 is an identity name to uniquely identify the PC 2 specified by the Computer Name 4431, and IP address, for example, can be used as it. The WWN4433 is a WWN number set in the Fibre Channel Interface Controller 220 equipped in each PC 2. The relationship between PC 2 and WWN allocated to said PC 2 can be managed by this table.

Hereinafter, the various processing's implemented in this embodiment example are explained.

[Registration of the User]

In this embodiment example, the user management is concentrated on the Management Console 4. At the time of the user registration, the administrator executes the User-LUN Management Program 441 on the Management Console 4 and inputs the pairs of user name and password using the I/O Device 42. The User-LUN Management Program 441 registers said inputted user name and password into the User-LUN Management Table 442. The password registered at this time may be changed later by each user. Continuously, the administrator creates LUs for the registered user. The administrator operates the User-LUN Management Program 441 successively and selects a physical disk unit in the Storage Subsystem 1 in which said LU is to be created, in the same way as that to create the LU in the 1st embodiment example. Next, the administrator defines the capacity of LU, Internal LUN, Virtual LUN, Port Number of the Storage Subsystem 1 to be used for the access to this LU, Target ID and the Attribute which defines the LU as private or shared. The Processor 41 in the Management Console 4 sets information given here except the capacity of LU in the corresponding columns on the User-LUN Management Table 442. The administrator operates the User-LUN Management Program 441 and issues an order to create the LUs. The processor 41 controls the Communication Control Circuit 43 and transfers the set information to the Storage Subsystem 1 in response to this order.

The Communication Control Circuit 14 in the Storage Subsystem 1 receives the set information transferred from the Management Console 4 and notifies the processor 11 of it. Upon receiving this notification, the processor 11 activates the LU Definition Program 131. The LU Definition Program 131 creates LU with the specified capacity on the specified physical disk unit. The Processor 11 registers the Port Number, Target ID, Virtual LUN, Internal LUN, and the Attribute in the LUN Management Table 132 based on the set information. These set information may be changed later. Incidentally, at this point, the WWN 1321 and S_ID 1321b are left undefined. After that, the LU Definition Program 131 controls the Communication Control Means 14 and reports that the creation of LU is completed, to the Management Console 4. The Management console 4 receives this report and notifies the administrator that the specified LU creation has succeeded.

[Log-In of the User]

Figure 15:
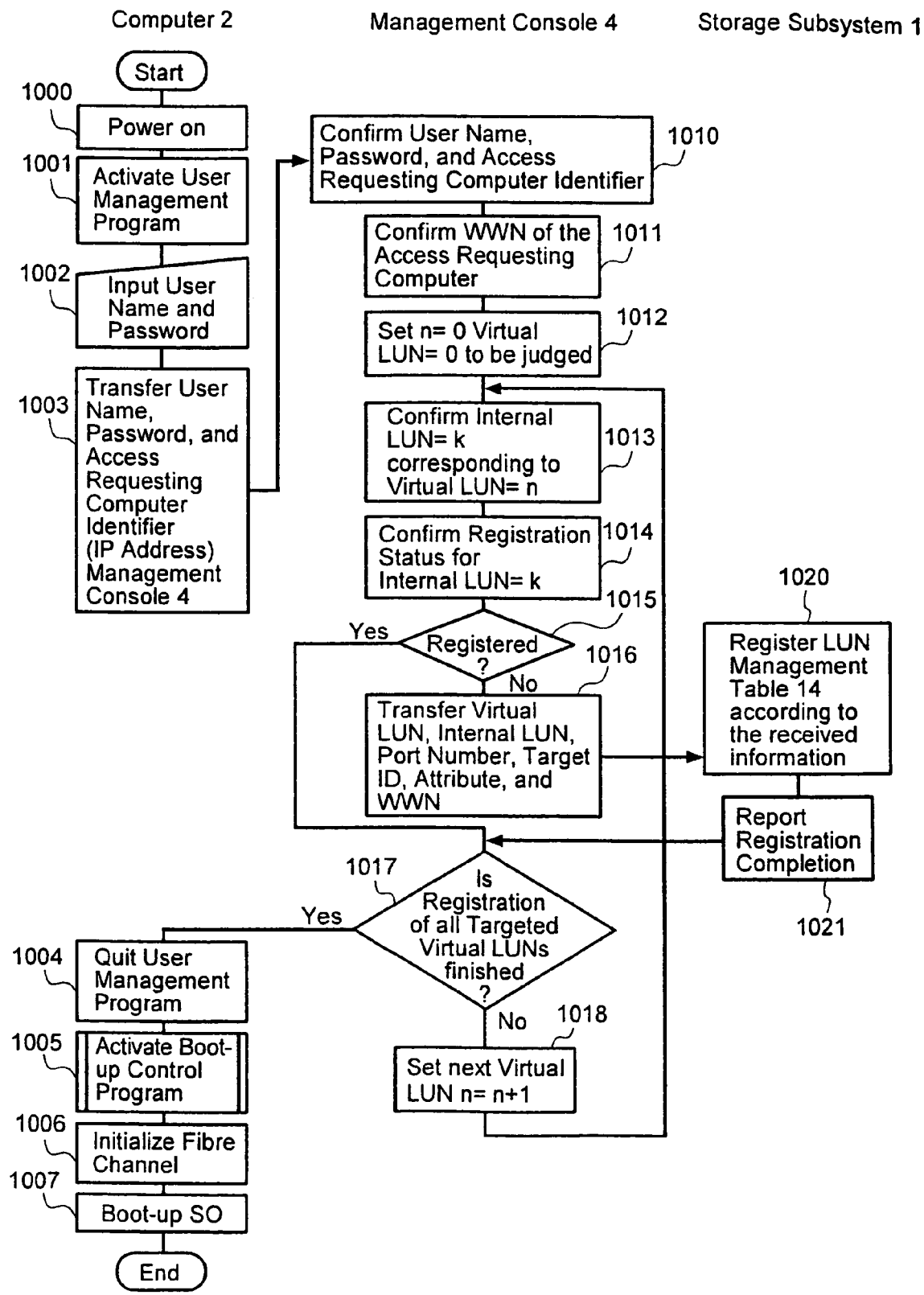
FIG. 15 is the flowchart of the Log-In processing in the 3rd embodiment example of the present invention.

FIG. 15 is the flowchart which shows the procedure for a user to use a Private LU allocated to the user by using a PC 2. The user powers on the PC 2 the user wants to use (Step 1000). Then, the User Management Program 251 in the PC 2 is activated (Step 1001). When the User Management Program 251 is activated, it requests of the user to input the user name and password. The user replies to this request and inputs the user name and password from I/O Device 23 (Step 1002). The User Management Program 251 transfers the inputted user name and the password and the identifier (IP address) of the PC 2 to the Management Console 4 through the Network 9 by controlling the Network Control Means 24. The information which is transferred here is called User Log-In information.

At the Management Console 4, the User Log-In information is acquired by the Network Control Circuit 46 and is notified the Processor 41. The Processor 41 activates the User-LUN Management Program 441 upon receiving said notification. The User-LUN Management Program 441 refers to the user name 4421 and password 4422 in the User-LUN Management Table 442 and authenticates whether this user is an authorized valid user (Step 1010). When the user who logged on is confirmed to be a valid user, the User-LUN Management Program 441 refers to the Computer Management Table 443 and confirms the WWN of the Computer through the identifier of the PC 2 (Step 1011).

Next, the User-LUN Management Program 441 refers to the User-LUN Management Table 442 and confirms LUs allocated to the user. The User-LUN Management Program 441 judges whether the LU corresponding to the PC 2 used by the user is already mounted or not. For example, when the user who wants to use the PC 2 is the last user who used the same PC 2 until now, unless an unmount processing is not expressly executed, the Storage Subsystem 1 maintains the LU in the mounted status. In this processing, at first, an initial value of the Virtual LUN to be judged is set to the variable n corresponding to the Virtual LUN to be judged. Usually, the variable n is set to 0 (Step 1012). The User-LUN Management Program 441 refers to the User-LUN Management Table 442 and specifies the Internal LUN corresponding to the Virtual LUN=n (Step 1013).

It is confirmed whether or not the LU having Internal LUN specified in step 1013 is registered in the Storage Subsystem 1 to be accessed by the PC 2. The User-LUN Management Program 441 refers to the User-LUN Management Table 442 and confirms whether or not the Internal LUN concerned is already mounted on the PC 2 by comparing the Computer Name 4429 to the identifier of the PC 2 contained in the Log-In information (Step 1014). According to the result of the above confirmation, the User-LUN Management Program 441 makes judgment whether the LU concerned is registered in Storage Subsystem 1 so that it can be used by the PC 2 (Step 1015). When the Computer Name is not registered in Storage Subsystem 1, the User-LUN Management Program 441 controls the Communication Control Means 43 and transfers all the information including Virtual LUN, Internal LUN, Port Number, Target ID, Attribute, and the WWN to the Storage Subsystem 1. The information which is transferred here to Storage Subsystem 1 is called Mount Information (Step 1016). If the Computer Name is registered in the Storage Subsystem 1, the User-LUN Management Program 441 skips this processing.

When the Communication Control Means 14 in the Storage Subsystem 1 receives the Mount Information, it notifies the Processor 11 of the fact. The Processor 11 activates the LU Definition Program 131 upon receiving this notification. According to the Mount Information, the LU Definition Program 131 sets the Port Number 1322, Target ID 1323, Virtual LUN 2=35, WWN 1321a and Attribute 1326 in the line of the Internal LUN in the LUN Management Table, and registers the Internal LUN concerned to make it accessible by the PC 2. The S_ID 1321b column is left blank because it is not defined at this time. After that, the LU Definition Program 131 reports (the ending report) that the registration setting has completed to the Management Console 4 (Step 1021).

When receiving the ending information from the Storage Subsystem 1, the User-LUN Management Program 441 in the Management Console 4 confirms whether or not the registration processing for all the Virtual LUNs allocated to the user concerned is finished (Step 1017). When there are still unregistered Virtual LUNs, the User-LUN Management Program 441 specifies the next Virtual LUN and repeat the processing from the step 1013 (Step 1018). when the registration of all Virtual LUNs is finished, the User-LUN Management Program 441 sends an ending report to the PC 2 (Step 1017). When receiving the ending report from the Management Console 4, the PC 2 finishes the processing by the User Management Program 251 (Step 1004).

Next, when the CPU 21 detects the Boot-up Control Program 2211 by searching the Memory Unit 221 in the Fibre Channel I/F 22, copies the Boot-up Control Program 2211 from the Memory Unit 221 to the Memory Unit 25 and executes the Boot-up Control Program 2211 on the Memory Unit 25 (Step 1005). When the Boot-up Control Program 2211 is activated, begins the initialization processing of the Fibre Channel. During this processing, the Logical Connection Processing which is called Port Log-In, is executed among the Fibre Channel Ports. When the processing of this Port Log-In succeeds, Logical Connection Relationship among the ports is established. In the Port Log-In, the WWN is used as the Port Name. Also, ID of each port is dynamically fixed. This ID is set with the protocol so that each port can have an independent number respectively. At this time, in the Storage Subsystem 1, Processor 11 activates the LU Definition Program 131. The LU Definition Program 131 recognizes the Fibre Channel Interface Controller 220 in the upper level Computer as one port of the Fibre Channel ports by means of the WWN and set its ID in the LUN Management Table 132 as the S_ID (Step 1006). The CPU 21, when this initialization of Fibre Channel is finished, executes the Boot-up Processing and executes Loading of the OS (Step 1007).

Figure 16:
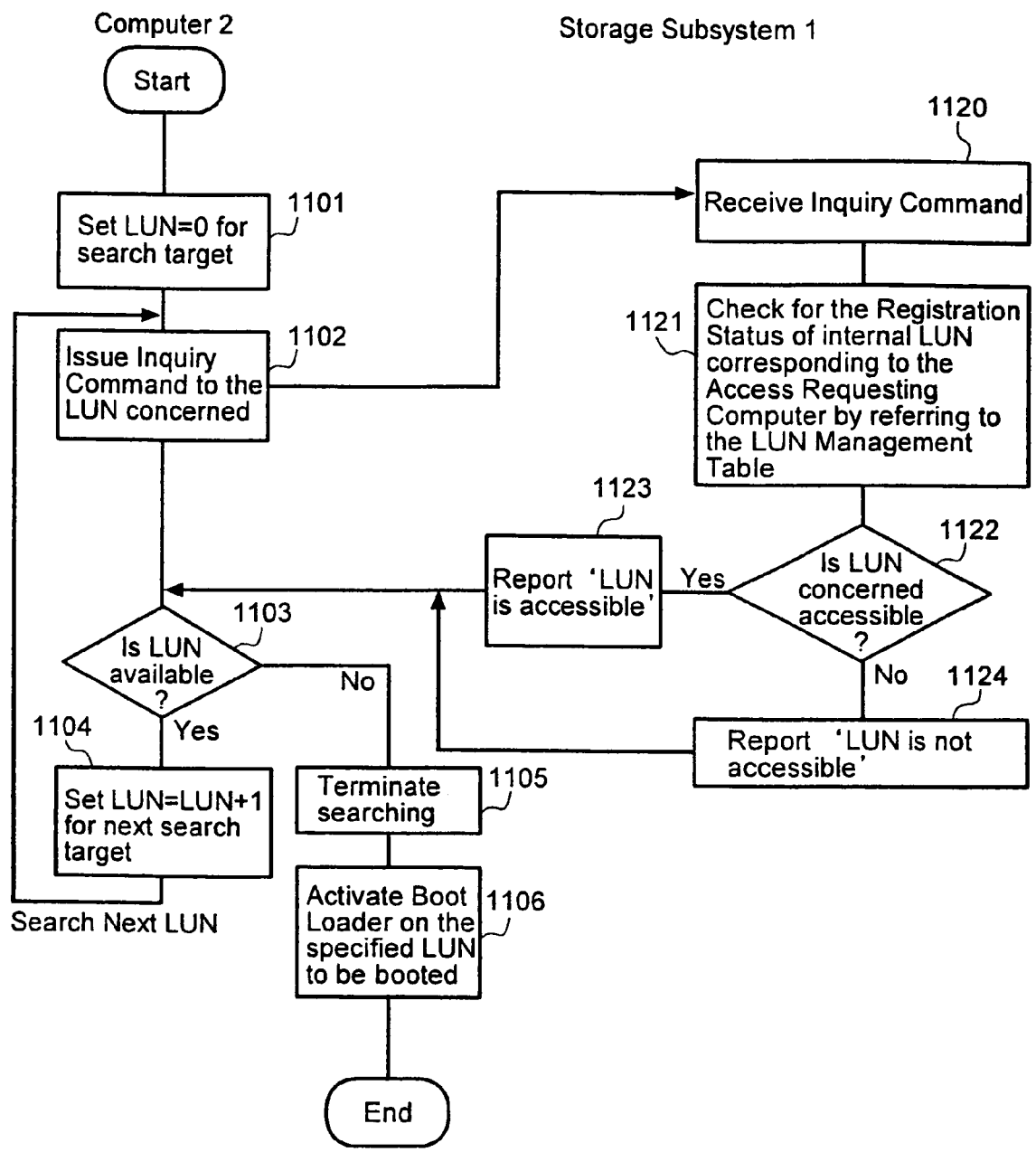
FIG. 16 is the flowchart which shows the procedure of the Boot-up processing.

FIG. 16 is the flowchart which shows the procedure of the Boot-up Processing in the step 1007. The Boot-up Control Program 2211 inspects the LUs in the Storage Subsystem 1 connected to the PC 2. At the beginning of the inspection, it sets the LUN to be inspected to 0 (Step 1101). The Boot-up Control Program 2211 specifies this LUN and issues Inquiry Command. The Inquiry Command is the command supported by the SCSI to investigate the type of storage, and capacity, and the other characteristic, and so on,(Step 1102). When the Fibre Channel I/F Control Circuit 12 in the Storage Subsystem 1 receives the Inquiry Command, it feeds this command to the Processor 11. When the Processor 11 receives this Inquiry Command, it activates the Access Control Program 133 (Step 1120). The Access Control Program 133 refers to the LUN Management Table 132 and confirms the targeted LUN to be inspected specified by the Inquiry Command. The targeted LUN specified by the PC 2 is the Virtual LUN. The Access Control Program 133 checks the existence of the Internal LUN by means of the Port Number which received this Inquiry Command, specified Target ID, and Virtual LUN. When Internal LUN concerned exists, the Access Control Program 133 compares the S_ID of the issuer included in the command frame of the Inquiry Command with S_ID stored in the LUN Management Table 132 (Step 1121). Based on this result of comparison, the Access Control Program 133 judges whether or not the LU having to the Internal LUN is accessible by the PC 2 which issued the Inquiry Command (Step 1122). If the both S_IDs agree each other, since the LU which has the Internal LUN corresponding to the targeted Virtual LUN is permitted to be accessed by the PC 2, the response containing the information to indicate "Specified LUN is available", capacity of the LU, and other Attribute information is returned to the PC 2 (Step 1123). When S_ID does not agree with each other, the LU which has the Internal LUN corresponding to the targeted Virtual LUN is not permitted to be accessed by the PC 2. Therefore, in this case, the information which shows "Specified LUN is not available" is returned to the PC 2 as the response. When the Port Number of the port which received the Inquiry Command, specified Target ID, and Internal LUN corresponding to the Virtual LUN can not be obtained, the response indicating "the LUN is not available" is returned, too (Step 1124).

When there is a response which shows "the LUN is available" from the Storage Subsystem 1, the Boot-up Control Program 2211 of the PC 2 proceeds to the next LUN by incrementing the targeted LUN by one and repeating the procedures following step 1102 (Step 1104). When the response from Storage Subsystem 1 shows "the LUN is not available", the Boot-up Control Program 2211 terminates the search for the LUN (Step 1105). The Boot Loader program stored in the LU having a designated LUN as "Designated Boot LUN", among the LUNs detected in the above searching operation, is read and written into the Memory Unit 25 and OS Loading is executed. That "Designated Boot LUN" is the information which designates the source of the OS to be loaded (from which LU in which Storage Subsystem) when more than one Storage Unit or LU are detected (step 1106).

By the above mentioned processing, the OS is loaded into the PC 2 and after that, the user becomes able to process using the application program or the data which is stored in the mounted LU.

According to the 3rd embodiment example, as mentioned above, any user within two or more users can mount the own Private LUs on any optional PC and can execute OS and application program in the environment which is specific to each user. Also, in this embodiment example, because OS, the application program, and all data for each user can be concentrated on one LU, the management of the system becomes easy.

Figure 17:
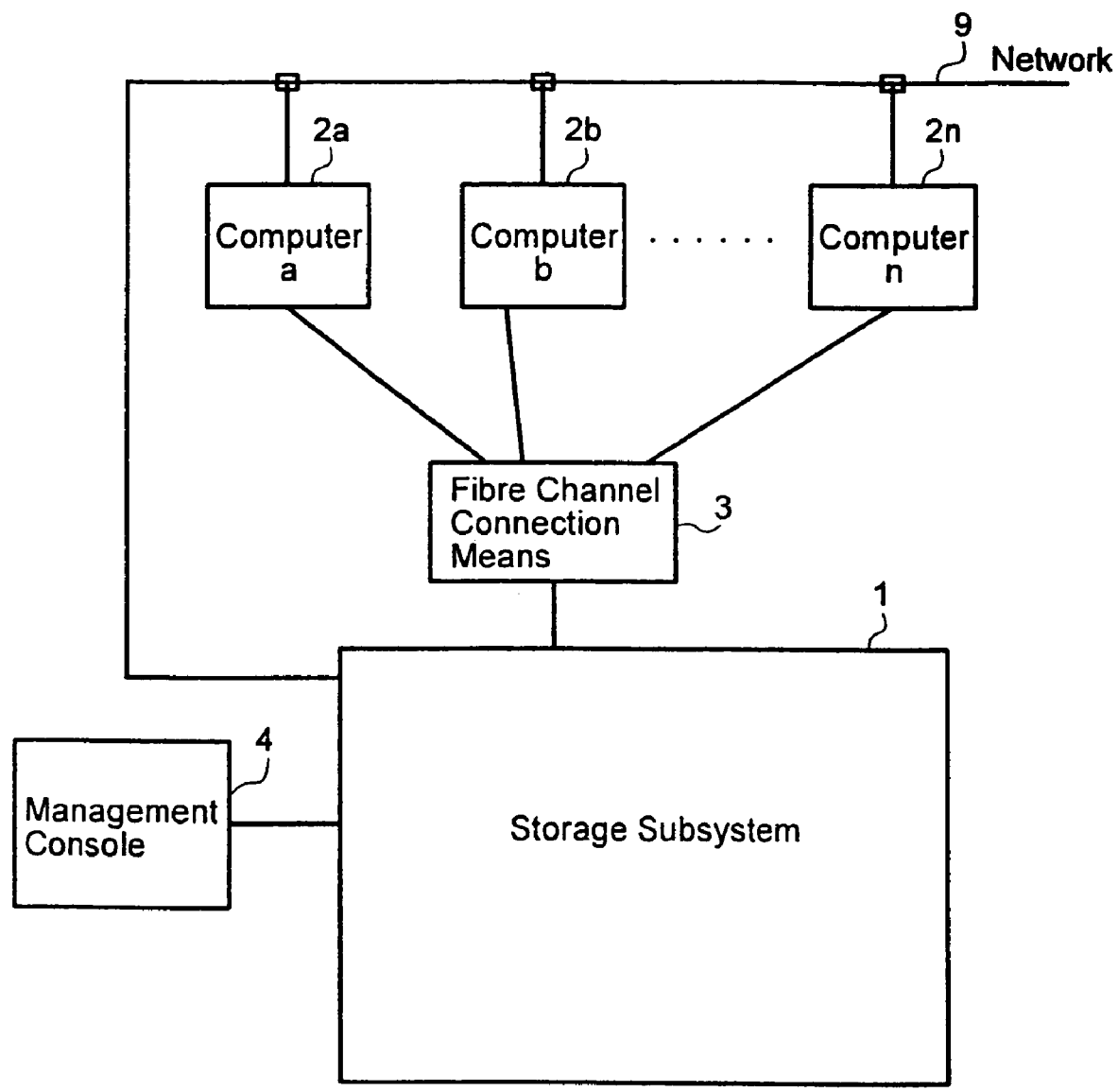
FIG. 17 is the block diagram which shows the configuration of the Computer System in the 4th embodiment example of the present invention.

FIG. 17 is the configuration of the Computer System in the 4th embodiment example of this invention. In the Computer System of this embodiment example, the Storage Subsystem 1 is connected with Network 9. In this embodiment example, the table equivalent to the User-LUN Management Table stored in the Memory Unit 44 in the Management Console 4 in the 3rd embodiment example is stored on the Memory Unit 25 in each PC 2. In this embodiment example, the relation between the User and LU allocated to the user is managed by the User-LUN Management Table stored in each PC 2. The Storage Subsystem 1 is equipped with the Network Control Means connected with Processor 11 to connect to the Network 9. The Management Console 4 in this embodiment example is not equipped with the User-LUN Management Table 442 nor the Computer Management Table 443 which were stored in the Memory Unit 44 in the 3rd embodiment example. Besides, the Management Console 4 has the LUN Management Program to perform the processing which will be explained later, in stead of the User-LUN Management Program 441. As for the other configurations in the system, they are composed like those in the 3rd embodiment example.

FIG. 18 shows a form of an example of the User-LUN Management Table installed in each PC 2. Regarding the User-LUN Management Table 252, the fields of "Registration Status" and "Computer Name", which were included in the User-LUN Management Table 442 in the 3rd embodiment example shown in the FIG. 13, are deleted, however, the other fields are set in the same way as the User-LUN Management Table 442.

FIG. 19 shows a form of an example of the LUN Management Table which is maintained in the Memory Unit 13 of Storage Subsystem 1 in this embodiment example. As shown in the figure, the "Use Status" field 1328 is added to the LUN Management Table 132*b*, in addition to the each field included in the LUN Management Tables 132 shown in the FIG. 12 in the 3rd embodiment example.

Hereinafter, as for the various processing which is implemented in this embodiment example, major items different from the 3rd embodiment example will be explained.

[Registration of the User]

In this embodiment example, the administrator or the user executes User Management Program 251 on each PC 2 used by the administrator or the user to register the user. The administrator or the user inputs a user name and a password using I/O Device 23. The User Management Program 251 registers the inputted user name and password in the columns of the user name and the password in the User-LUN Management Table 252 respectively. The LU which is allocated to the user is defined using the Management Console 4 in the same way as the 3rd embodiment example. However it is different from the 3rd embodiment example that the Management Console 4 does not manage users. The Management Console 4 just defines and creates LUs communicating with the Storage Subsystem 1. The correspondence between the LU and User is defined in each PC 2.

[Log-In of the User]

Figure 20:
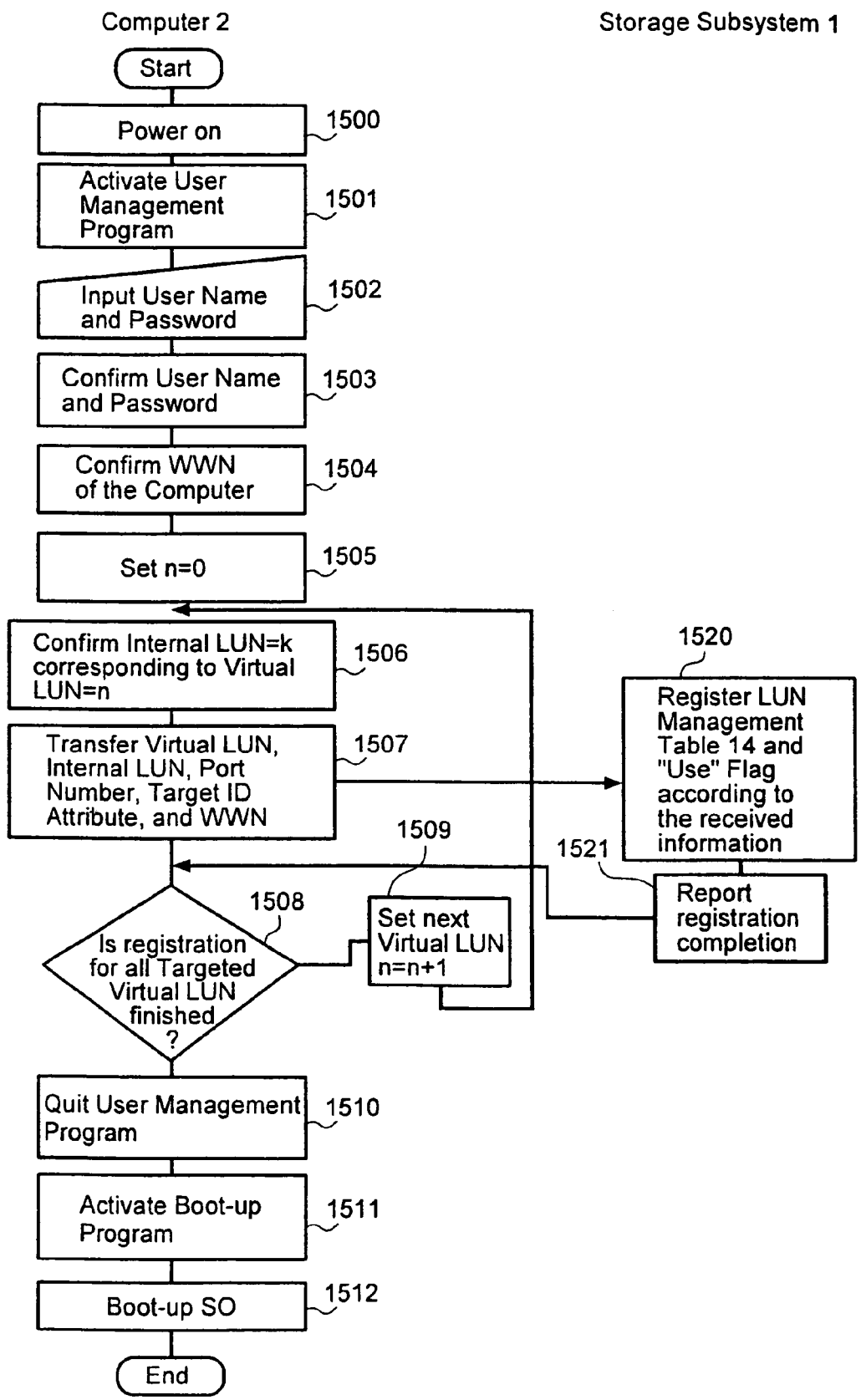
FIG. 20 is the flowchart of the Log-In Processing in the 4th embodiment example of the present invention.

FIG. 20 is the flowchart which shows the procedure for an user to use Private LUs allocated to the user by using a PC. The user powers on the PC 2 the user want to use (Step 1500). When the PC is powered on, the User Management Program 251 in the PC 2 is activated following it (Step 1501). When the User Management Program 251 is activated, it requests for the input of the user name and the password from the user. The user inputs the user name and password in response to this request by operating the I/O Device 23 (Step 1502). When the User Management Program 251 accepts the input of the user name and password, it refers to the user names and passwords which are registered in the User-LUN Management Table 252 and authenticates whether or not this user is the valid user who is authorized to use the system (Step 1503). If the user is a valid user, the User Management Program 251 refers to the WWN information 2212 which is stored in the Memory Unit 221 of the Fibre Channel I/F 22 and confirms the WWN of the PC 2 (Step 1504).

Next, the User Management Program 251 confirms the LU which is allocated to the user by referring to the User-LUN Management Table 252. Here, at first, it sets the valuable n corresponding to Virtual LUN to be judged to an initial value. Usually, this initial value is set to 0 (Step 1505). The User Management Program 251 refers to the User-LUN Management Table 252 and decides the Internal LUN which corresponds to Virtual LUN=n (Step 1506). The User Management Program 251 transfers the Mount Information which contains the Virtual LUN, Internal LUN, Port Number, Target ID, Attribute, and the WWN to the Storage Subsystem 1 via the Network 9 (Step 1507).

In the Storage Subsystem 1, in the same way as the 3rd embodiment example, the LU Definition Program 131 registers the information which has been sent as the Mount Information in the LUN Management Table 132. With this, the LU which has been specified by the sender PC 2 becomes accessible by the PC 2. At this time, it sets the flag which shows "Used" in the column 1328 of the "Use Status". This Flag performs an exclusive function to prevent a Mount Request issued by the other PC using the same ID from being accepted by mistake and the LU from being mounted on said PC. When the "Used" flag is already set for "Use Status" column, the LU is already used by the other user using the identical user ID. In this embodiment example, in such a case, the registration of the LU fails. In the 3rd embodiment example, such process was unnecessary because the LUs could be managed by the Management Console 4 in the centralized manner. However, in this embodiment example, this process is indispensable because, each LU is managed by each PC dispersively (Step 1520). When the registration processing is finished normally, the LU Definition Program 131 reports the completion of registration to the PC 2 (Step 1521).

When receiving the ending report of the registration from the Storage Subsystem 1, the User-LUN Management Program 251 in the PC 2 confirms whether or not the registration processing is finished for all Virtual LUNs which are allocated to the user (Step 1508). When there are some Virtual LUNs left unregistered, the User-LUN Management Program 251 return to the processing of step 1506 after incrementing the value of variable n and continues the registration processing (Step 1509). When the registration of all Virtual LUNs is finished, PC 2 quits (step 1510) the User Management Program 251 and executes the OS Boot-up in the same way as the 3rd embodiment example (Steps 1511, 1512).

[Cancellation of the Registration]

If one LU in the Storage Subsystem 1 to be used by a user is mounted on some PC in the above procedure, then, the LU cannot be accessed by the other PC. Therefore, when the PC finishes using the LU, the registration must be canceled for the LU to be unmounted. For example, the User Management Program 251 is scheduled to be activated when the power is turned off after the user finishes using the PC 2. When the User Management Program 251 is activated when the power is turned off, it communicates with the Storage Subsystem 1 in the same way as in the registration processing and instructs the Storage Subsystem 1 to cancel the registration. The Storage Subsystem 1 cancels the registration by changing the entry in the column 1328 of the "Use Status" in the LUN Management Table 132 corresponding to the PC 2 to "Unused". In the case where the PC 2 is powered off by a software control called Soft Switch, the above mentioned method is applicable. Additionally, the cancellation is also realized by activating the program which cancels the registration when the OS is shut down. By this registration cancellation, the user becomes able to use the same LU again using other PC 2 after that.

Hereinafter, the 5th embodiment example of this invention is explained. The configuration of the Computer System in this embodiment example is basically the same as the 3rd embodiment example. However, in this embodiment example, the PC 2 and the Management Console 4 do not necessarily have to be connected through the network. In this embodiment example, like the 3rd or 4th embodiment example, the user can define the Private LU in the Storage Subsystem 1. In the 3rd and 4th embodiment examples, the Management Console 4 and the PC 2 managed the correspondence between the User and LU respectively. In this embodiment example, the correspondence between the User and LU is not managed directly, instead, the WWN which is used on each PC 2 is allocated to each user, and the correspondence between said WWN and LU is managed in the Storage Subsystem 1. Thus, in this embodiment example, the correspondence between User and LU is managed indirectly. The PC 2 in this embodiment example maintains the User-WWN Management Table to manage the WWN corresponding to the user in the Memory Unit 25. As shown in FIG. 21, the User-WWN Management Table 253 maintains the password 2532 and the WWN 2533 registered concerning the user corresponding to the User Name 2531.

In the Memory Unit 25 of the PC 2, the WWN Information Modification Program which is executed by the CPU 21 to rewrite the WWN information 2212 stored in the Memory Unit 221 in the Fibre Channel I/F 22 is also stored. The Management console 4 is composed like the Management Console in the 4th embodiment example.

Hereinafter, as for the processing which is done in the Computer System of this embodiment example, the difference from the 3rd embodiment example is mainly explained.

[Registration of the User]

The registration of the user is done in the way that the administrator or the user executes the User Management Program 251 in all PC 2, and inputs a user name and a password from the I/O Device 23. At this time, one WWN is allocated to each user. The User Management Program 251 registers the inputted user name, password, and the allocated WWN in each column of the User Name 2531, Password 2532, and the WWN 2533 respectively in the User-WWN Management Table 253.

The LU used by each user to use is created using the Management Console 4 like that in the 4th embodiment example. When creating the LU, the Management Console 4 accepts the input of the WWN allocated to the user who uses the created LU and instructs the Storage Subsystem 1 to set said WWN in the LUN Management Table 132 giving correspondence to said WWN to the LUN allocated to the created LU. The LU Definition Program 131 in the Storage Subsystem 1 sets the information in the LUN Management Table 132 in response to this instruction.

[Log-In of the User]

Figure 22:
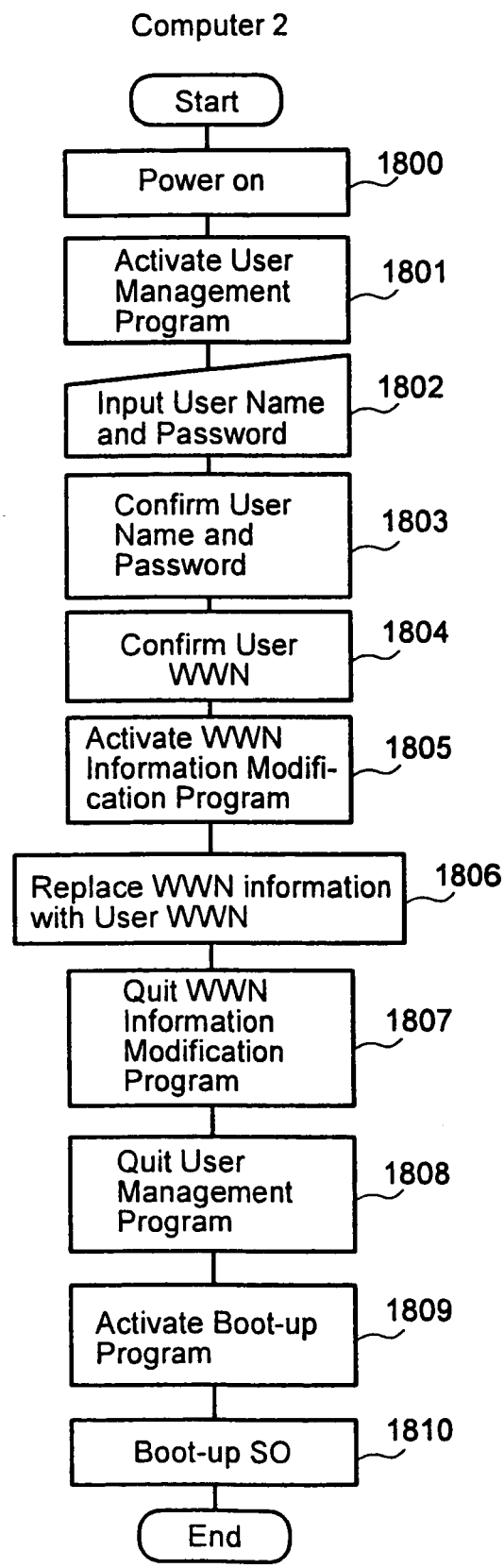
FIG. 22 is the flowchart of the Log-In Processing in the 5th embodiment example of the present invention.

FIG. 22 is the flowchart which shows the procedure for a user and to use Private LUs allocated to the user using a PC. The user powers on the PC 2 the user want to use (Step 1800). When the PC 2 is powered on, the User Management Program 251 in the PC 2 is activated (Step 1801). When the User Management Program 251 is activated, it requests for the input of the user name and the password from the user. The user inputs the user name and password in response to this request and by operating the I/O Device 23 (Step 1802). The User Management Program 251 refers to the user name and the password which are registered in the User-LUN Management Table 253 and authenticates whether or not the user is the valid user who is authorized to use the system (Step 1803).

When the user is authenticated to be a valid user, the User Management Program 251 confirms (step 1804) the WWN which is allocated to this user by referring to the User-WWN Management Table and activates the WWN Information Modification Program 254 (Step 1805). The WWN Information Modification Program 254 replace the WWN information 2212 which is stored in the Memory Unit 221 in the Fibre Channel I/F 22 with the WWN which has been confirmed in the step 1804 (Step 1806). When the replacement of the WWN information 2212 is finished, the WWN Information Modification Program 254 terminates processing and returns it to the User Management Program 251 (Step 1807). User Management Program 251 terminates processing when the processing is returned from WWN Information Modification Program 254 (Step 1808). Next, the Boot-up program is activated (step 1809) and since then, the Boot-up processing is executed like that in the 3rd embodiment example, (Step 1810).

When the Storage Subsystem 1 receives an access from the PC 2, it executes the exclusive control on the targeted LU based on the WWN used by the PC 2. That is, the Storage Subsystem 1 permits this access only when relation between the Internal LUN and the WWN stored in the LUN Management Table 132 is maintained. Therefore, only PC 2 having the WWN allocated to the user is permitted to access the Private LU of the user.

In the embodiment examples, from the 3rd to the 5th, explained above, the LU allocated to each user is mounted on a Computer for the user to make use of it, this method will be applicable to the other applications. For example, by providing more than one LU each of those operates with a different type of OS and/or Application Program and by making each LU to be used being accessed from its corresponding environments, a heterogeneous environment system running under a same Computer can be realized. In this case, by using an environment name instead of the user name as the Log-In name, the OS Boot-up can be executed from the LU having necessary environment in accordance with the user requirement. Owing to this mechanism, when the Boot-up is done from one LU having a specific environment, the LU having other environments are completely hidden. Therefore, any complicated setting for OS or Application are not required unlike the traditional way of Multi-Boot mechanism for OS switching, so that more stable system switching can be realized. Additionally, in a environment of the program development or testing or so on, by storing the backup copy on a specified LU every day, the current LU can be immediately swapped to the LU having the old status without any modification on the system settings when it is required to restore the old status. By extending the relation between the user and LU up to the relation between the environment and LU in this way, the widely flexible Computer System can be constructed.

The invention claimed is:

1. A computer system comprising:
   plural computers; and
   a storage system comprising plural interface control circuits coupled to said plural computers and plural logical units,
   wherein each of said plural logical units has an internal logical unit number and a virtual logical unit number;
   the internal logical unit numbers are used in said storage system for identifying said logical units and each of said logical units has a different internal logical unit number;
   the virtual logical unit numbers are used by said computers for identifying which of said logical units are accessible therefrom, and to those of said logical units which are accessible from each computer, virtual logical unit numbers beginning from 0 are assigned;
   said storage system is arranged to store information among the internal logical unit numbers, virtual logical unit numbers, and computers using the corresponding virtual logical unit numbers, and
   said storage system is arranged to receive an access request including a virtual logical unit number from a computer, convert the received virtual logical unit number to the corresponding internal logical unit number by referring to said information, and access the logical unit indicated by the internal logical unit number.

2. A computer system according to claim 1, wherein sequential virtual logical unit numbers beginning from 0 are assigned to logical units accessible from each computer.

3. A computer system according to claim 2, wherein each computer causes to be searched, logical units accessible from the computer sequentially from a logical unit indicated by a virtual logical unit number 0, and causes searching to stop when a missing virtual logical unit number is encountered.

4. A computer system according to claim 1,
wherein each of said plural computers comprises a boot-up control program, and
each of said plural computers is arranged to execute its boot-up control program, detects a logical unit indicated by virtual logical unit number 0, and executes a boot-up process of an Operating System stored in the detected logical unit.

5. A computer system according to claim 1, wherein said storage system comprises a shared logical unit accessible from plural ones of said computers, and a logical unit indicated by a virtual logical unit number 0 used by one of said computers is the shared logical unit which is also indicated by a virtual logical unit number 0 used by another of said computers.

6. A computer system according to claim 1, wherein a logical unit indicated by a virtual logical unit number 0 used by one of said computers is a different logical unit from a logical unit indicated by a virtual logical unit number 0 used by another of said computers.

7. A method for managing storage in a computer system having plural computers with access to a storage system, the storage system having plural interface control circuits coupled to plural computers and plural logical units, the method comprising the steps of:
assigning an internal logical unit number and a virtual logical unit number for identifying each of said plural logical units;
identifying said logical units by said internal logical unit numbers in said storage system, each of said logical units having a different internal logical unit number;
for each of said computers individually, assigning said virtual logical unit numbers for identifying those of said logical units which are accessible from each computer, beginning from virtual logical unit number 0;
identifying which of said logical units are accessible from each computer by said virtual logical unit numbers;
storing information among the internal logical unit numbers, virtual logical unit number, and computers using corresponding virtual logical unit numbers;
upon receiving an access request including a virtual logical unit number from one of said computers, converting the received virtual logical unit number to the corresponding internal logical unit number by referring to said information; and
accessing a logical unit indicated by the internal logical unit number.

8. A method according to claim 7, further comprising the step of assigning sequential virtual logical unit numbers beginning from 0 for identifying logical units accessible from each computer.

9. A method according to claim 8, further comprising the steps, performed at the command of one of said computers, of:
searching logical units sequentially from a logical unit indicated by a virtual logical unit number 0; and
stopping said searching when a missing virtual logical unit number is encountered.

10. A method according to claim 7, further comprising the steps, performed at the command of one of said computers, of:
detecting a logical unit indicated by a virtual logical unit number 0; and
executing a boot-up process of an Operating System stored in the detected logical unit.

11. A method according to claim 7, further comprising the step of sharing one of said logical units among more than one of said computers, said shared logical unit being indicated by the virtual logical unit number 0 by each of said sharing computers.

12. A method according to claim 7, further comprising the steps of:
assigning the virtual logical number 0 for identifying a first one of said logical units by a first one of said computers; and
assigning the virtual logical number 0 for identifying a second one of said logical units by a second one of said computers;
wherein said first logical unit is different from said second logical unit, and said first computer is different from said second computer.

13. A computer-readable storage containing computer-executable program code which, when executed, implements a method comprising the steps of:
assigning an internal logical unit number and a virtual logical unit number for identifying each of a plurality of logical units in a storage system coupled to plural computers;
identifying said logical units by said internal logical unit numbers in said storage system, each of said logical units having a different internal logical unit number;
for each of said computers individually, assigning said virtual logical unit numbers for identifying those of said logical units which are accessible from each computer, beginning from virtual logical unit number 0;
identifying which of said logical units are accessible from each computer by said virtual logical unit numbers;
storing information among the internal logical unit numbers, virtual logical unit number, and computers using corresponding virtual logical unit numbers;
upon receiving an access request including a virtual logical unit number from one of said computers, converting the received virtual logical unit number to the corresponding internal logical unit number by referring to said information; and
accessing a logical unit indicated by the internal logical unit number.

14. A computer-readable storage according to claim 13, the implemented method further comprising the step of assigning sequential virtual logical unit numbers beginning from 0 to logical units accessible from each computer.

15. A computer-readable storage according to claim 14, the implemented method further comprising the steps, performed at the command of one of said computers, of:
searching logical units sequentially from a logical unit indicated by a virtual logical unit number 0; and
stopping said searching when a missing virtual logical unit number is encountered.

16. A computer-readable storage according to claim 13, the implemented method further comprising the steps, performed at the command of one of said computers, of:
detecting a logical unit indicated by a virtual logical unit number 0; and
executing a boot-up process of an Operating System stored in the detected logical unit.

17. A computer-readable storage according to claim 13, the implemented method further comprising the step of assigning the virtual logical unit number 0 for identifying one of said logical units by each of at least two of said computers, such that said at least two of said computers share said one of said logical units.

18. A computer-readable storage according to claim 13, the implemented method further comprising the steps of:

assigning the virtual logical unit number 0 for identifying a first one of said logical units by a first one of said computers; and assigning the virtual logical unit number 0 for identifying a second one of said logical units by a second one of said computers;

wherein said first logical unit is different from said second logical unit, and said first computer is different from said second computer.

* * * * *